(12) United States Patent
Kurauchi

(10) Patent No.: US 7,548,984 B2
(45) Date of Patent: Jun. 16, 2009

(54) STREAM DISTRIBUTION SYSTEM, STREAM SERVER DEVICE, CACHE SERVER DEVICE, STREAM RECORD/PLAYBACK DEVICE, RELATED METHODS AND COMPUTER PROGRAMS

(75) Inventor: Nobukazu Kurauchi, Nagoya (JP)

(73) Assignee: Panasonic Corporation, Osaka (JP)

( * ) Notice: Subject to any disclaimer, the term of this patent is extended or adjusted under 35 U.S.C. 154(b) by 892 days.

(21) Appl. No.: 10/444,403

(22) Filed: May 23, 2003

(65) Prior Publication Data

US 2004/0064574 A1    Apr. 1, 2004

(30) Foreign Application Priority Data

May 27, 2002    (JP)    ............................. 2002-151938

(51) Int. Cl.
  *G06F 15/16*    (2006.01)
(52) U.S. Cl. ..................... 709/231; 709/203; 709/229; 709/232; 709/238; 725/44; 725/47; 725/48; 725/49; 382/232; 382/284
(58) Field of Classification Search ................. 709/203, 709/223, 231–238, 243–244, 246–247; 725/44, 725/47–49, 91–94, 105, 118; 382/232, 284
  See application file for complete search history.

(56) References Cited

U.S. PATENT DOCUMENTS 6,035,329 A     3/2000 Mages et al.
6,535,919 B1 *  3/2003 Inoue et al. ................. 709/229
7,073,028 B2 *  7/2006 Lango et al. ................ 711/118

2001/0042249 A1 * 11/2001 Knepper et al. ............... 725/42

(Continued)

FOREIGN PATENT DOCUMENTS

EP              0 893 920           1/1999

(Continued)

OTHER PUBLICATIONS

K. Kawachiya et al., Videoproxy a Media and Protocol Converter for Internet Video, Global Information Infrastructure (GII) Evolution: Interworking Issues. 1996, Third International symposium on Interworking, Japan, Oct. 1-3, 1996, pp. 541-550.

(Continued)

*Primary Examiner*—William C Vaughn, Jr.
*Assistant Examiner*—Mohamed Ibrahim

(57) ABSTRACT

The invention aims to protect content copyright and reduce the load on a stream server device in a stream distribution system having the stream server device, which stores bitstreams that include contents and control information necessary for image playback of contents, a plurality of terminal devices that playback received bitstreams, and a cache server device that mediates between these devices. A header separation unit in the stream server device separates header information, which is control information, from a bitstream stored in a storage unit. A data transmitting unit transmits the bitstream from which header information has been removed to the cache server device before a predetermined time, and transmits the header information to the cache server device at the predetermined time. The cache server device transmits a bitstream that combines the bitstream, which was received first, and the header information, which was received later, to a terminal device. The terminal device receives the bitstream at the predetermined time, and plays the content.

40 Claims, 13 Drawing Sheets

U.S. PATENT DOCUMENTS

2002/0059575 A1    5/2002  Watts et al.
2002/0174354 A1*  11/2002  Bel et al. .................... 713/193
2003/0009628 A1*   1/2003  Gruner et al. ............... 711/130

FOREIGN PATENT DOCUMENTS

| EP | 0 993 142 | 4/2000 |
| EP | 1 148 688 | 10/2001 |
| EP | 1 248 433 | 10/2002 |
| JP | 10336625 | 12/1998 |
| WO | WO 00/33208 | 6/2000 |
| WO | WO 00/44172 | 7/2000 |
| WO | WO 00/77683 | 12/2000 |
| WO | WO 01/78386 | 10/2001 |

OTHER PUBLICATIONS

C. Griwodz et al., Protecting VOD the Easier Way, Proceedings of the ACM Multimedia Sep. 12-16, 1998, International Multimedia Conference, New York, NY pp. 21-28.

Little, Thomas D.C. et al., "Prospects for Interactive Video-on-Demand", Sep. 21, 1994, IEEE Multimedia Fall, No. 3, New York, US, pp. 14-24.

* cited by examiner

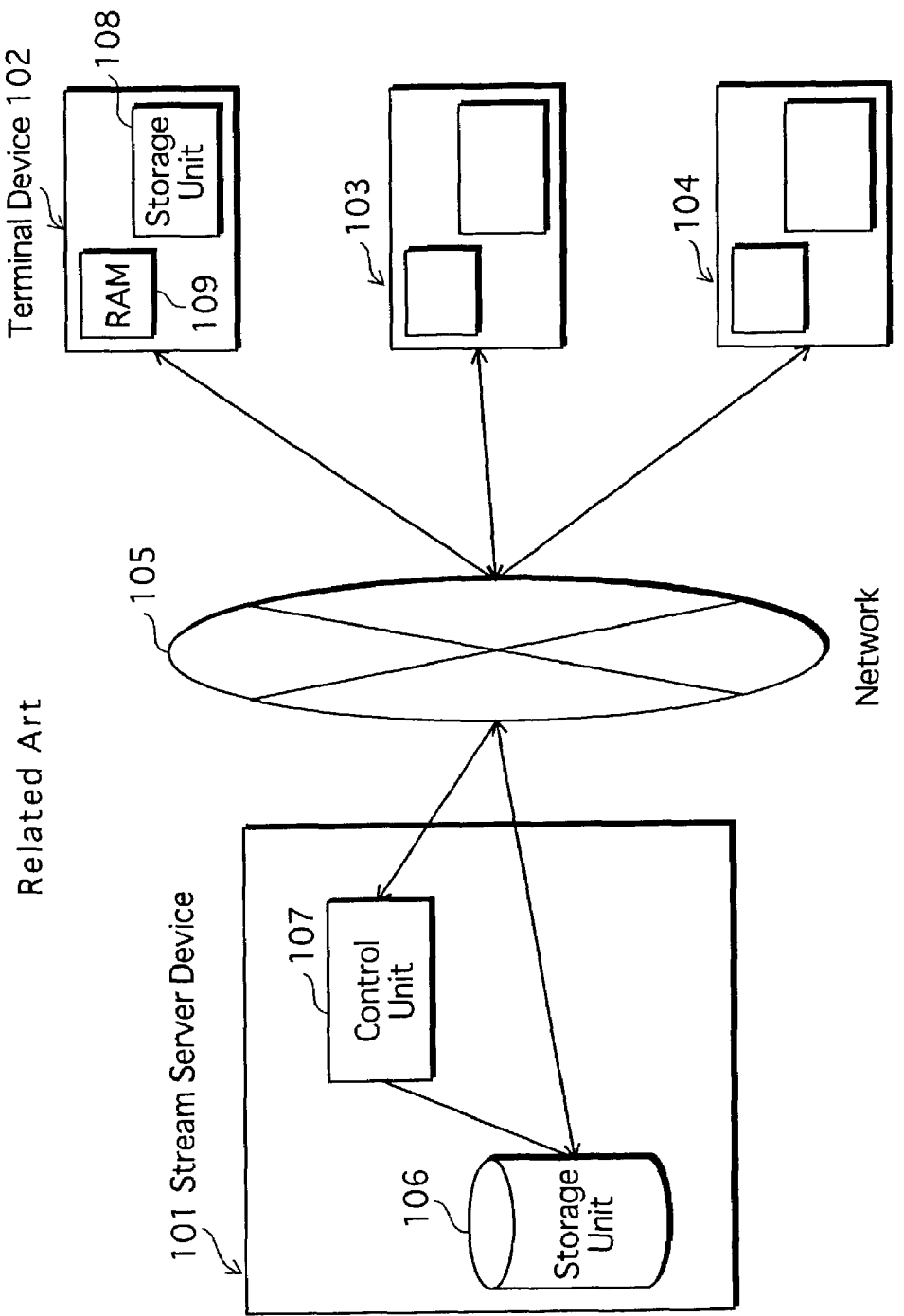

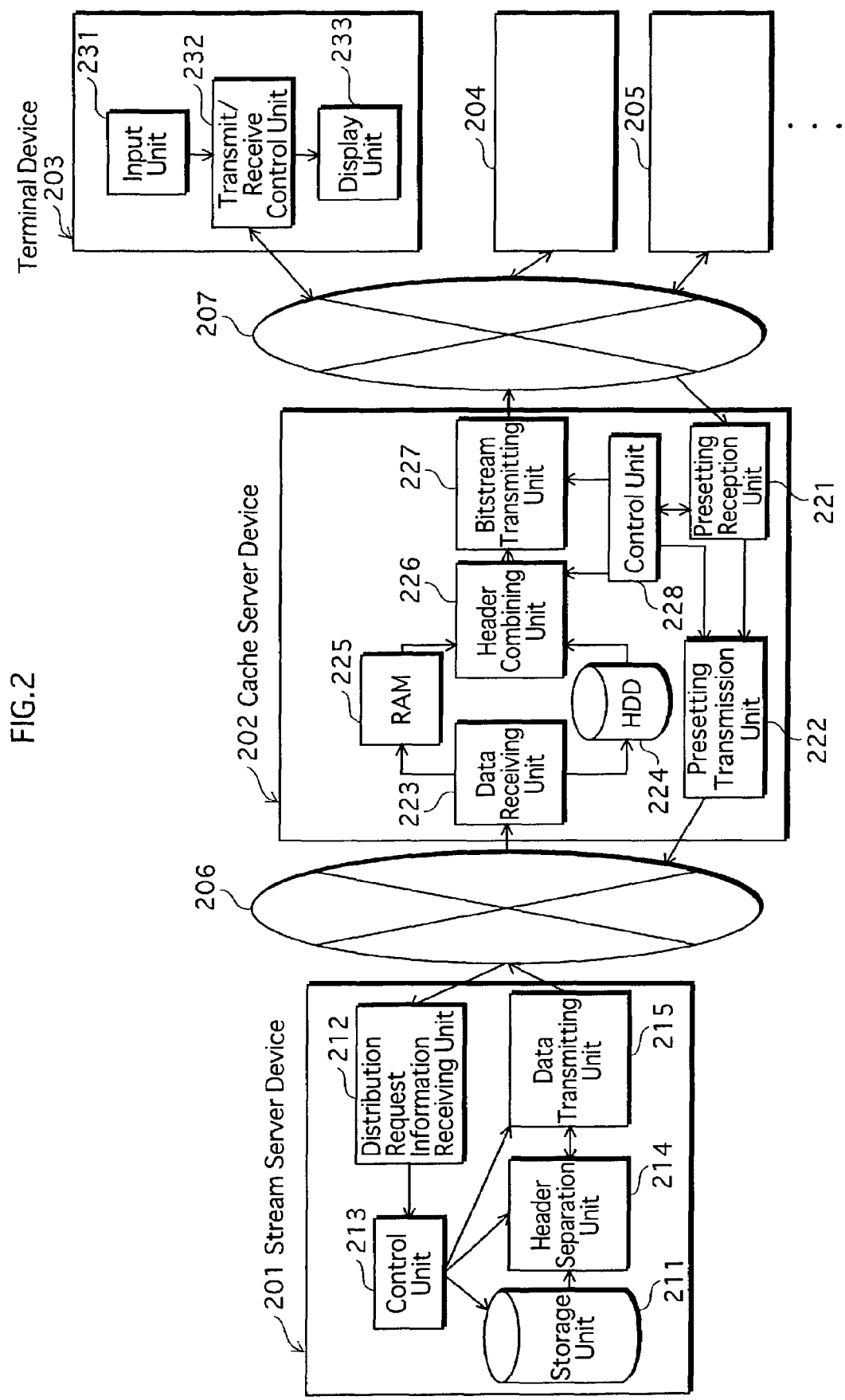

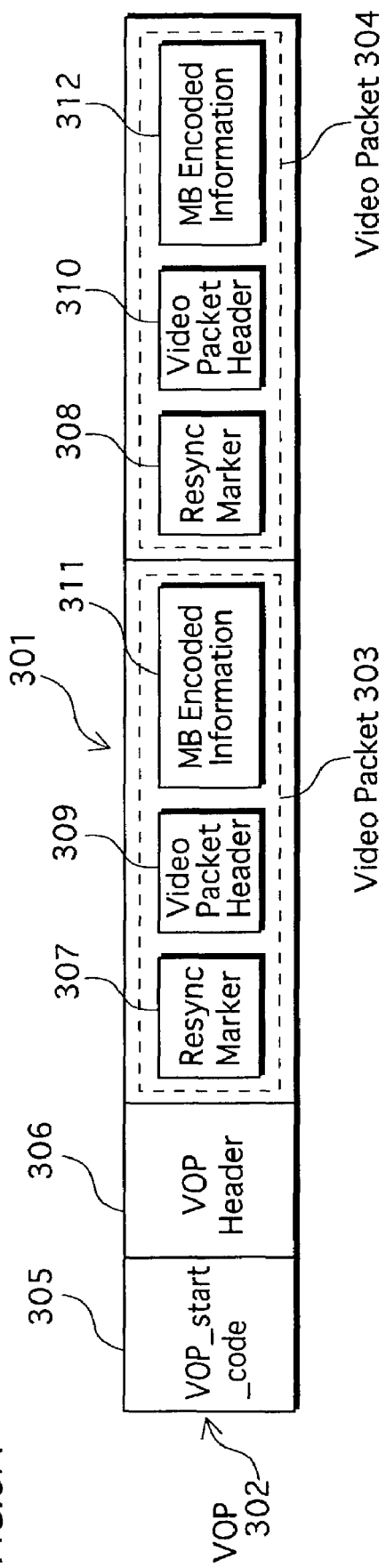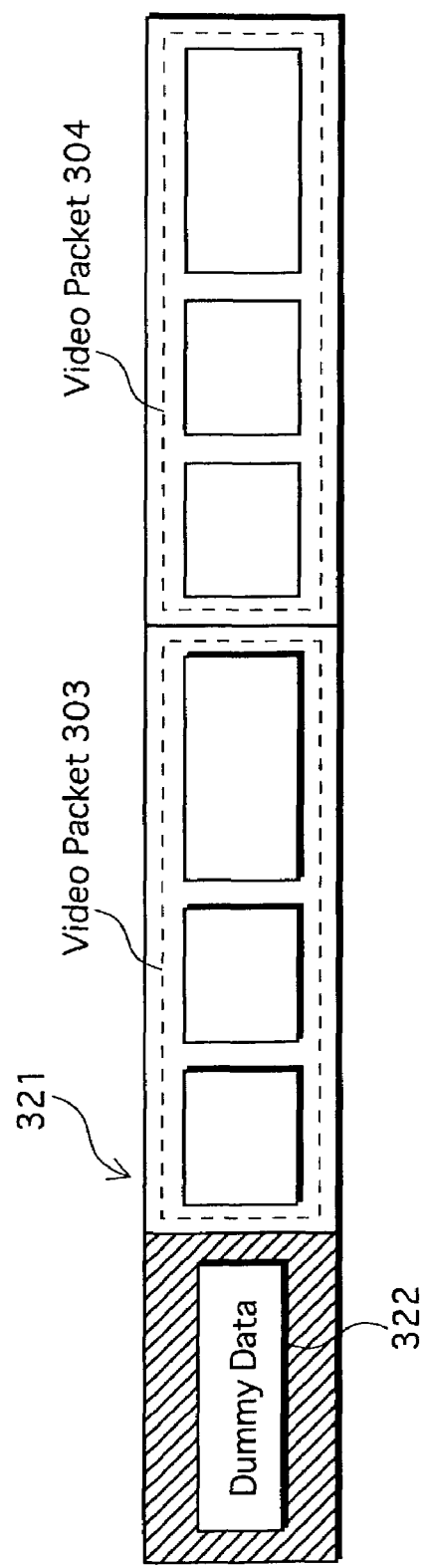

FIG.9

Distribution Request Information Table
901

| Terminal Identifier | Content Identifier | Preset Distribution Time |
|---|---|---|
| 0203 | 「Movie A」 | 20:00 25/5 (sun) |
| 0204 | 「Movie B」 | 19:00 26/5 (mon) |
| 0205 | 「Period Drama C」 | 22:00 26/5 (mon) |
| ... | ... | ... |

Header Information Elimination Table
1301

1302  1303

| Content Name | Header Information Elimination Level |
|---|---|
| Content A | 1(remove all) |
| Content B | 2(remove part) |
| Content C | 3(remove none) |
| ⋮ | ⋮ |

STREAM DISTRIBUTION SYSTEM, STREAM SERVER DEVICE, CACHE SERVER DEVICE, STREAM RECORD/PLAYBACK DEVICE, RELATED METHODS AND COMPUTER PROGRAMS

BACKGROUND OF THE INVENTION

1. Field of the Invention

The present invention relates to a stream distribution system that distributes video, audio and other bitstreams stored in a stream server device.

2. Related Art

In recent years, as a result of the rapid expansion of high-speed networks, personal computers (hereafter, "PCs"), digital television receivers and the like into common households, request-type information provider services such as VOD (video on demand) are now becoming widely available.

A request-type information provider service is realized by a stream distribution system that distributes bitstreams of video data, audio data and the like, prestored in a server device or similar center, in response to a distribution request from a user connected to the server device, from the server device to the user that made the request.

FIG. 1 is a structural diagram of a stream distribution system that provides a conventional request-type information provider service.

This stream distribution system is connected to a stream server device 101 owned by the owner of contents such as video, music and the like, and terminal devices 102, 103, 104, . . . , used by respective users, via a network 105 such as the Internet or CATV (cable television). Here, terminal device 102 and the like are pieces of information equipment such as a PC, a set-top box (hereafter, "STB"), a mobile information terminal device (hereafter "personal digital assistant" or "PDA"), and a mobile telephone.

The following description relates to a request-type information provider service in this stream distribution system.

Video, audio and other contents that have been compressed and formed into digital packets (i.e. bitstreams) based, for example, on the MPEG (Moving Picture Expert Group) 2 standard are stored in a storage unit 106 of stream server device 101.

A user using terminal device 102 selects a content from the content bitstreams stored in storage unit 106 of stream server device 101 owned by a content holder, in accordance with a Web browser or similar display mounted in terminal device 102, and presets the desired time of distribution. The name of the selected content, the preset distribution time and other information is transmitted to a control unit 107 in stream server device 101 via network 105.

Having received a request, control unit 107 in stream server device 101 selects a bitstream of the content requested for distribution by the user from storage unit 106 when the preset distribution time is reached, and transmits, via network 105, the selected bitstream to terminal device 102 used by the user that made the distribution request.

As such, it is possible for the user of terminal 102 to view requested contents at desired times.

However, the following problems arise in relation to this conventional stream distribution system due to network traffic congestion and the like caused by the rapidly increasing number of terminal devices connected to networks in recent years.

One significant problem is the increased load on stream server device 101 following increases in the number of users requesting distribution at any one time, and this causes delays and the like due to the distribution functions of control unit 107 in stream server device 101 not working properly. In view of current technical benchmarks, the limit for a single stream server device 101 on a commercial basis is distribution to several thousand terminal devices at any one time, and simultaneous distribution to a greater number of terminal devices than this proves very difficult.

A second problem is that the routes from stream server device 101 to terminals 102, 103, 104, . . . pass through various server devices, routers and the like, this being a characteristic of the Internet, which is presently the primary form of network 105. Use of these routes is not guaranteed at the time of access, and as a result realtime playback in accordance with a user's distribution request it is often impossible.

When these two problems overlap, as in the case of a user making a distribution request of stream server device 101, for example, within a time zone in which distribution requests from other terminal devices are concentrated, or for a bitstream of a content with respect to which there is a concentration of distribution requests, so-called "timeouts", in which the bitstream is interrupted during playback, may frequently occur.

To date, various techniques have been suggested in order to overcome these problems. In the case of contents being stored in bitstream form based on MPEG-1 or MPEG-2 standards, unexamined Japanese application publication no. 10-336625 discloses, when there has been a distribution presetting from terminal device 102, a technique for distributing, out of a GOP (group of pictures) forming a content whose distribution has been preset, only B-pictures for bi-directional interframe estimation and P-pictures for backward interframe estimation (i.e. I-pictures that have undergone intraframe encoding are excluded) from stream server device 101 to a storage unit 108 provided in terminal device 102 prior to a preset distribution time, and transmitting only I-pictures from stream server device 101 to terminal device 102 when the preset distribution time (realtime) is reached. According to this technique, since bitstreams consisting only of I-pictures need be transmitted realtime from stream server device 101 to terminal device 102, data volume for realtime transmission can be reduced when the proportion of I-pictures in a GOP is low, and as mentioned above, it is thus possible to suppress time zones in which distribution requests are concentrated, suppress increases in network traffic when popular contents are preset for distribution, and suppress load increases on stream server device 101.

According to the above technique, a bitstream of B-pictures and P-pictures, which has been distributed from stream server device 101 without I-pictures, is stored in storage unit 108 in terminal devices 102, 103, 104, . . . , a bitstream of I-pictures distributed from stream server device 101 at a preset distribution time is combined with the bitstream of B-pictures and P-pictures in a RAM 109, which is a volatile random access memory provided in terminal device 102 and the like, and the resultant bitstream is played. Since I-pictures resulting from encoding the original image are not stored in terminal device 102 and so forth, the original image cannot be discerned by a user, even if images formed only from B-pictures and P-pictures which have undergone motion estimation are played.

In other words, since a user cannot decode and view original images prior to a preset distribution time (i.e. until I-pictures are distributed from stream server device 101), this technique makes it possible to distribute bitstreams of part of contents to terminal device 102 and the like in advance without causing concern to content holders, and thus allows also for security protection and copyright protection of contents.

However, this technique gives rise to the following problems.

First, when a large proportion of I-pictures occupy a GOP in a content bitstream, it is preferable not to reduce the data volume of an I-picture bitstream for transmitting from stream server device 101 at a preset distribution time.

Furthermore, in recent VOD technologies and stream distribution systems, bitstream formats for describing contents have shifted from encoding formats standardized in MPEG-1 and MPEG-2, which occupied the conventional mainstream, to bitstream formats standardized by MPEG-4 and having greater compression rates (i.e. greater reduction of the amount of compressed data with respect to the same original data volume).

Because, in the MPEG-4 format, bitstream format is regulated as a prerequisite to transmission/reception via a network, a large number of server devices, routers and so forth at a distribution time, error resilience when via a network is greatly improved in comparison to conventional MPEG-1 or MPEG-2 bitstream formats.

Adapting technology disclosed in the above unexamined Japanese application publication no. 10-336625 to the above MPEG-4 bitstream format allows bitstreams from which the number of I-VOPs ("video object planes"; equivalent of I-pictures in MPEG-1 & 2 formats) has been reduced to be distributed in advance. Because of the high error resilience, measures such as intraframe encoding some of the P-VOPs and B-VOPs (equivalent of P-pictures and B-pictures in MPEG-1 & 2 formats) are taken with MPEG-4 format bitstreams, and thus images that allow estimation of original images can be played in a terminal device, even from bitstreams containing no I-VOPs. This creates significant security problems in relation to copyrights held by content holders (i.e. contents are divulged).

Here, realtime playback of contents is conventionally conducted by transmitting content bitstreams using broadband transmission routes, and in terms of the current state of technology, realtime playback of contents using narrowband transmission routes compares unfavorably to the use of broadband transmission routes in terms of image quality, image size, and the like.

SUMMARY OF THE INVENTION

To solve the above issues, a first object of the present invention is to provide a stream distribution system capable of reducing the load on a stream server device, together with protecting copyrights held by content holders.

A second object of the present invention is to provide a stream distribution system that allows streams to be transmitted using narrowband transmission routes, and for high-quality realtime playback of contents.

A third object of the present invention is to prevent network traffic complications.

The first and second objects of the present invention can be achieved by a stream distribution system having a stream server device that stores a stream which includes a content and control information necessary for image playback of the content, a plurality of terminal devices that playback a received stream, and a cache server device that mediates between the stream server device and the terminal devices via a network. The stream server device includes: a separating unit operable to separate a stream of control information from the stored stream; and a first stream transmitting unit operable to transmit the stream from which control information has been removed to the cache server device before a predetermined time, and to transmit the stream of control information to the cache server device when the predetermined time is reached. The cache server device includes: a receiving unit operable to receive the stream from which control information has been removed and the stream of control information; a storage unit operable to store the received stream from which control information has been removed; a combining unit operable to combine the received stream of control information with the stream stored by the storage unit; and a second stream transmitting unit operable to transmit a stream that results from the combining by the combining unit to one or more of the terminal devices, the transmitted stream being the same as the stream stored by the stream server device.

According to this structure, since a stream that must be sent on or after a predetermined time consists only of control information, it is possible to reduce the load on the stream server device, and moreover, since the stream transmitted prior to the predetermined time is not for realtime playback, this stream can be transmitted over an extended time period using a narrowband transmission route, and thus effective use of bandwidth is realized.

The third object of the present invention can be achieved by the stream distribution system further including another cache server device for mediating between the stream server device and the terminal devices via a network.

According to this structure, since content distribution requests from terminal devices can be dispersed to a plurality of cache server devices, it is possible to prevent network traffic complications.

Furthermore, the first and second objects of the present invention can also be achieved by a stream server device in a stream distribution system having the stream server device, which stores a stream that includes a content and control information necessary for image playback of the content, a plurality of terminal devices that playback a received stream, and a cache server device that mediates between the stream server device and the terminal devices via a network. The stream server device includes: a separating unit operable to separate a stream of control information from the stored stream; and a stream transmitting unit operable to transmit the stream from which control information has been removed to the cache server device before a predetermined time, and to transmit the stream of control information to the cache server device when the predetermined time is reached.

According to this structure, since the data volume of a stream transmitted on or after a predetermined time is low, the load on the stream server device can be reduced. Moreover, since a stream transmitted prior to the predetermined time can be transmitted over an extended time period using a narrowband transmission route, effective use of bandwidth is realized.

Here, the control information maybe header information, and the separating unit may separate a stream of header information from the stored stream.

According to this structure, since header information necessary for image playback of contents is not transmitted prior to a predetermined time, it is not possible to playback images from the stream stored in the cache server device prior to the predetermined time, even if attempts are made to playback a transmitted stream. Consequently, it is possible to protect the copyrights of content holders prior to the predetermined time.

Here, the stored stream may be an MPEG-4 format bitstream, the separating unit may separate a VOP start code and VOP header from the bitstream, and the stream transmitting unit may transmit the bitstream from which the VOP start code and the VOP header have been removed to the cache server device before the predetermined time, and transmit the VOP start code and the VOP header to the cache server device when the predetermined time is reached.

According to this structure, it is possible to effectively prevent image data of contents recorded in a VP (video packet) of a VOP from being played prior to a predetermined time.

Here, the separating unit may include a dummy data inserting subunit operable, when the stream of header information has been separated from the stored stream, to insert dummy data into an area in the stream from which the header information was removed, and the stream transmitting unit may transmit the stream which has dummy data inserted in place of the header information to the cache server device before the predetermined time.

According to this structure, it is possible to easily replace header information with dummy data in a cache server device.

Here, the separating unit may further include a flag subunit operable to turn on, in a predetermined location of the dummy data, a flag showing that header information has been replaced.

According to this structure, it is possible to effectively replace header information with dummy data in a cache server device.

Here, the stored stream may be one of an MPEG-1 and an MPEG-2 format bitstream, and the separating unit may separate a system header from the bitstream.

According to this structure, it is possible to effectively prevent image data of contents recorded in an elementary stream of a PES packet from being played prior to a predetermined time.

Here, the stored stream may be one of an MPEG-1 and an MPEG-2 format bitstream, and the separating unit may separate a packet header from the bitstream.

According to this structure, it is possible to effectively prevent image data of contents recorded in a payload of a TS packet from being played prior to a predetermined time.

Here, the predetermined time may be a preset distribution time, and the stream server device may include a distribution information reception unit operable to receive from the cache server device, distribution information that includes a content identifier and the preset distribution time.

According to this structure, it is possible to reduce the load on a stream server device in correspondence with the VOD system.

Here, the predetermined time may be a broadcast time, and the stream transmitting unit may include a narrowband transmission subunit operable to transmit, over an extended time period, the stream from which control information has been removed to the cache server device before the broadcast time, and to transmit, in realtime over a narrowband, the stream of control information to the cache server device when the broadcast time is reached.

According to this structure, it is possible to realize broadcasts using a narrowband transmission route effectively.

The first and second objects of the present invention can also be achieved by a cache server device in a stream distribution system having a stream server device that stores streams which include contents and control information necessary for image playback of the contents, a plurality of terminal devices that playback received streams, and one or more of the cache server devices, each of which mediates between the stream server device and the terminal devices via a network. The cache server device includes: a receiving unit operable to receive a stream from which control information has been removed and a stream of control information; a receiving unit operable to receive a stream from which control information has been removed and a stream of control information; a storage unit operable to store the received stream from which control information has been removed; a combining unit operable to combine the received stream of control information with the stream stored by the storage unit; and a stream transmitting unit operable to transmit a stream that results from the combining by the combining unit to one or more of the terminal devices.

According to this structure, it is possible to protect copyrights held by content holders, since contents cannot be played until a control information stream is received, even if a stream from which control information has been removed is stored in a cache server device.

Here, the cache server device may further include: a preset distribution information receiving unit operable to receive from each terminal device, preset distribution information that includes a content identifier of a content whose distribution is requested by the terminal device, a preset distribution time, and a terminal identifier of the terminal device; and a distribution information transmitting unit operable to transmit to the stream server device, distribution information that includes the content identifier, the preset distribution time, and a cache server identifier of the cache server device. Furthermore, the receiving unit may receive the stream from which control information has been removed before the preset distribution time, and receive the stream of control information when the preset distribution time is reached, and the stream transmitting unit may transmit the stream to the terminal device identified by the terminal identifier in the received preset distribution information.

According to this structure, it is possible for a cache server device to transmit a stream that combines a stream stored prior to a preset distribution time notified by a terminal device and a stream of control information received when the preset distribution time is reached to a terminal device that made the distribution presetting, when the preset distribution time is reached.

Here, the control information maybe header information, a stream having dummy data inserted in an area of the header information may be stored in the storage unit, and the combining unit may include: a header information acquiring subunit operable to acquire the stream of header information received by the receiving unit; and a header information replacing subunit operable to replace the dummy data included in the stored stream with the acquired stream of header information.

According to this structure, it is possible to easily replace dummy data inserted in an area of header information and received prior to a preset distribution time with header information received on or after the preset distribution time.

Here, the stored stream may be MPEG-4 format bitstream, a VOP start code and a VOP header may be included in at least one of the acquired pieces of header information, flags in the pieces of dummy data may be on, the header information acquiring unit may judge, for each piece of acquired header information, whether the VOP start code is included, and the header information replacing unit, when judged that the VOP start code is included, may replace a corresponding piece of dummy data whose flag is on with the VOP start code and the VOP header.

According to this structure, it is possible to effectively replace dummy data having an "on" flag in an area of a VOP start code and a VOP header of an MPEG-4 format VOP with a VOP start code and a VOP header.

The first and second objects of the present invention can also be achieved by a stream distribution system having a stream server device that stores a stream which includes a content and control information necessary for image playback of the content, and a plurality of stream record/playback devices that are connected via a network. The stream server device includes: a separating unit operable to separate a stream of control information from the stored stream; and a stream transmitting unit operable to transmit the stream from which control information has been removed to one or more of the stream record/playback devices before a predetermined time, and to transmit the stream of control information to the one or more stream record/playback devices when the predetermined time is reached. The stream record/playback devices each include: a receiving unit operable to receive the stream from which control information has been removed and the stream of control information; a storage unit operable to store the received stream from which control information has been removed; a combining unit operable to combine the received stream of control information with the stream stored by the storage unit; and a stream playback unit operable to playback a stream that results from the combining by the combining unit, the played stream being the same as the stream stored by the stream server device.

According to this structure, it is possible in a stream record/playback device to realize copyright protection and reduce the load on a stream server device.

The first and second objects of the present invention can also be achieved by a stream server device in a stream distribution system having the stream server device, which stores a stream that includes a content and control information necessary for image playback of the content, and a plurality of stream record/playback devices that are connected via a network. The stream server device includes: a separating unit operable to separate a stream of control information from the stored stream; and a stream transmitting unit operable to transmit the stream from which control information has been removed to one or more of the stream record/playback devices before a predetermined time, and to transmit the stream of control information to the one or more stream record/playback devices when the predetermined time is reached.

According to this structure, it is possible to reduce the load on a stream server device and realize copyright protection.

Here, the control information may be header information, the stream server device may have a header information elimination table that includes, for each content, a header information elimination level, and the separating unit may separate header information in accordance with the header information elimination level of each content.

According to this structure, it is possible in a stream record/playback device to allow complete or partial content playback prior to a predetermined time.

The first and second objects of the present invention can also be achieved by a stream record/playback device in a stream distribution system having a stream server device that stores a stream which includes a content and control information necessary for image playback of the content, and a plurality of the stream record/playback devices, which are connected via a network. The stream record/playback device includes: a receiving unit operable to receive a stream from which control information has been removed and a stream of control information; a storage unit operable to store the received stream from which control information has been removed; a combining unit operable to combine the received stream of control information with the stream stored by the storage unit; and a stream playback unit operable to playback a stream that results from the combining by the combining unit, the played stream being the same as the stream stored by the stream server device.

According to this structure, it is possible to reduce the load on a stream server device and realize copyright protection of contents.

The first and second objects of the present invention can also be achieved by a stream distribution method of a stream distribution system having a stream server device that stores a stream which includes a content and control information necessary for image playback of the content, a plurality of terminal devices that playback a received stream, and a cache server device that mediates between the stream server device and the terminal devices via a network. The stream distribution method includes: a separating step in the stream server device of separating a stream of control information from the stored stream; a first stream transmitting step in the stream server device of transmitting the stream from which control information has been removed to the cache server device before a predetermined time, and transmitting the stream of control information to the cache server device when the predetermined time is reached; a receiving step in the cache server device of receiving the stream from which control information has been removed and the stream of control information; a storage step in the cache server device of storing the received stream from which control information has been removed; a combining step in the cache server device of combining the received stream of control information with the stream stored in the storage step; and a second stream transmitting step in the cache server device of transmitting a stream that results from the combining in the combining step to one or more of the terminal devices, the transmitted stream being the same as the stream stored by the stream server device.

According to this structure, it is possible to realize copyright protection of contents and reduce the load on a stream server device.

The first and second objects of the present invention can also be achieved by a stream distribution method of a stream server device in a stream distribution system having the stream server device, which stores a stream that includes a content and control information necessary for image playback of the content, a plurality of terminal devices that playback a received stream, and a cache server device that mediates between the stream server device and the terminal devices via a network. The stream distribution method includes: a separating step of separating a stream of control information from the stored stream; and a stream transmitting step of transmitting the stream from which control information has been removed to the cache server device before a predetermined time, and transmitting the stream of control information to the cache server -device when the predetermined time is reached.

The first and second objects of the present invention can also be achieved by a stream transmit/receive method of a cache server device in a stream distribution system having a stream server device that stores a stream which includes a content and control information necessary for image playback of the content, a plurality of terminal devices that playback a received stream, and one or more of the cache server devices, each of which mediates between the stream server device and the terminal devices via a network. The stream transmit/receive method includes: a receiving step of receiving a stream from which control information has been removed and a stream of control information; a storage step of storing the received stream from which control information has been removed; a combining step of combining the received stream of control information with the stream stored in the storage step; and a stream transmitting step of transmitting a stream that results from the combining in the combining step to one or more of the terminal devices, the transmitted stream being the same as the stream stored by the stream server device.

The first and second objects of the present invention can also be achieved by a stream distribution method of a stream distribution system having a stream server device that stores a stream which includes a content and control information necessary for image playback of the content, and a plurality of stream record/playback devices that are connected via a network. The stream distribution method includes: a separating step in the stream server device of separating a stream of control information from the stored stream; a stream transmitting step in the stream server device of transmitting the stream from which control information has been removed to one or more of the stream record/playback devices before a predetermined time, and transmitting the stream of control information to the one or more stream record/playback devices when the predetermined time is reached; a receiving step in each stream record/playback device of receiving the stream from which control information has been removed and the stream of control information; a storage step in each stream record/playback device of storing the received stream from which control information has been removed; a combining step in each stream record/playback device of combining the received stream of control information with the stream stored in the storage step; and a stream playback step in each stream record/playback device of playing a stream that results from the combining in the combining step, the played stream being the same as the stream stored by the stream server device.

The first and second objects of the present invention can also be achieved by a stream distribution method of a stream server device in a stream distribution system having the stream server device, which stores a stream that includes a content and control information necessary for image playback of the content, and a plurality of stream record/playback devices that are connected via a network. The stream distribution method includes: a separating step of separating a stream of control information from the stored stream; and a stream transmitting step of transmitting the stream from which control information has been removed to one or more of the stream record/playback devices before a predetermined time, and transmitting the stream of control information to the one or more stream record/playback devices when the predetermined time is reached.

The first and second objects of the present invention can also be achieved by a stream record/playback method of a stream record/playback device in a stream distribution system having a stream server device that stores a stream which includes a content and control information necessary for image playback of the content, and a plurality of the stream record/playback devices, which are connected via a network. The stream record/playback method includes: a receiving step of receiving a stream from which control information has been removed and a stream of control information; a storage step of storing the received stream from which control information has been removed; a combining step of combining the received stream of control information with the stream stored in the storage step; and a stream playback step of playing a stream that results from the combining in the combining step, the played stream being the same as the stream stored by the stream server device.

The first and second objects of the present invention can also be achieved by a computer program for making a computer that is included in a stream server device execute a stream distribution method of the stream server device, which stores a stream that includes a content and control information necessary for image playback of the content and which is in a stream distribution system having the stream server device, a plurality of terminal devices that playback a received stream, and a cache server device that mediates between the stream server device and the terminal devices via a network. The computer program includes: a separating step of separating a stream of control information from the stored stream; and a stream transmitting step of transmitting the stream from which control information has been removed to the cache server device before a predetermined time, and transmitting the stream of control information to the cache server device when the predetermined time is reached.

By applying a program such as this to a stream server device having a computer internalized, it is possible to realize copyright protection of contents and reduce the load on a stream server device.

The first and second objects of the present invention can also be achieved by a computer program for making a computer that is included in a cache server device execute a stream transmit/receive method of the cache server device, which is in a stream distribution system having a stream server device that stores a stream which includes a content and control information necessary for image playback of the content, a plurality of terminal devices that playback a received stream, and one or more of the cache server devices, each of which mediates between the stream server device and the terminal devices via a network. The computer program includes: a receiving step of receiving a stream from which control information has been removed and a stream of control information; a storage step of storing the received stream from which control information has been removed; a combining step of combining the received stream of control information with the stream stored in the storage step; and a stream transmitting step of transmitting a stream that results from the combining in the combining step to one or more of the terminal devices, the transmitted stream being the same as the stream stored by the stream server device.

The first and second objects of the present invention can also be achieved by a computer program for making a computer that is included in a stream server device execute a stream distribution method of the stream server device, which stores a stream that includes a content and control information necessary for image playback of the content and which is in a stream distribution system having the stream server device and a plurality of stream record/playback devices that are connected via a network. The computer program includes: a separating step of separating a stream of control information from the stored stream; and a stream transmitting step of transmitting the stream from which control information has been removed to one or more of the stream record/playback devices before a predetermined time, and transmitting the stream of control information to the one or more stream record/playback devices when the predetermined time is reached.

The first and second objects of the present invention can also be achieved by a computer program for making a computer that is included in a stream record/playback device execute a stream record/playback method of the stream record/playback device, which is in a stream distribution system having a stream server device that stores a stream which includes a content and control information necessary for image playback of the content, and a plurality of the stream record/playback devices, which are connected via a network. The computer program includes: a receiving step of receiving a stream from which control information has been removed and a stream of control information; a storage step of storing the received stream from which control information has been removed; a combining step of combining the received stream of control information with the stream stored in the storage step; and a stream playback step of playing a stream that results from the combining in the combining step, the played stream being the same as the stream stored by the stream server device.

BRIEF DESCRIPTION OF THE DRAWINGS

These and other objects, advantages and features of the invention will become apparent from the following description thereof taken in conjunction with the accompanying drawings that illustrate specific embodiments of the present invention.

In the drawings:

FIG. 1 is a structural diagram of a conventional stream distribution system;

FIG. 2 is a structural diagram of a first embodiment of a stream distribution system relating to the present invention;

FIG. 3A is a schematic diagram of exemplary stream packets stored in a storage unit of a stream server device of the above embodiment;

FIG. 3B shows stream packets transmitted to a cache server device, these stream packets being the stream packets shown in FIG. 3A having had header information removed by a header separation unit and replaced by dummy data;

FIG. 9 shows a distribution request information table storing distribution request information received by a presetting reception unit in the cache server device of the above embodiment;

FIG. 13 shows an exemplary header information elimination table set in advance by a header separation unit in the stream server device according to a variation of the above embodiment.

DETAILED DESCRIPTION OF THE PREFERRED EMBODIMENTS

Figure 4:
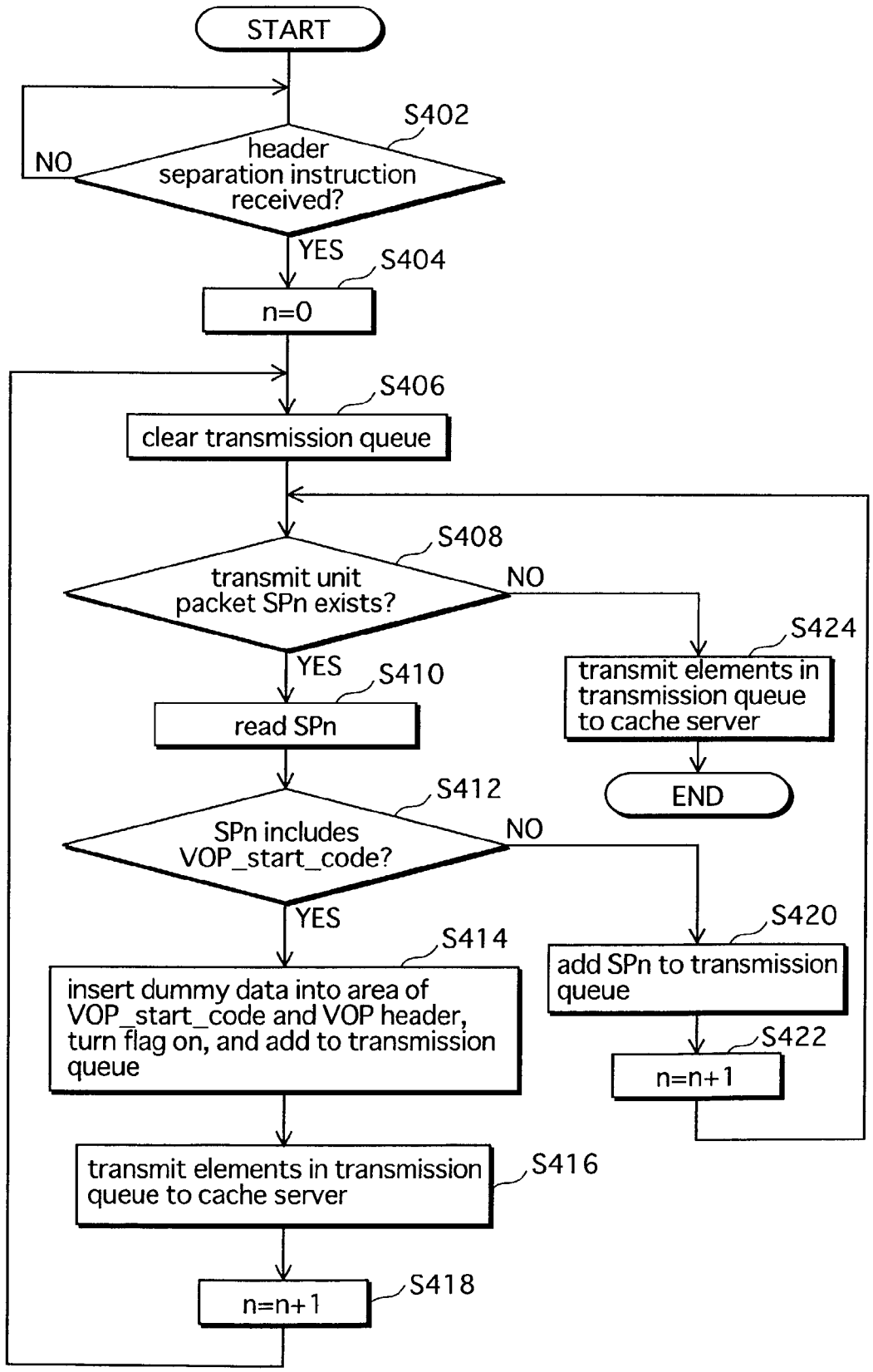
FIG. 4 is a flowchart depicting operations performed by the stream server device of the above embodiment to transmit a bitstream that excludes header information.

The following description relates to embodiments of a stream distribution system according to the present invention with reference to the drawings.

First Embodiment

FIG. 2 is a structural diagram of a first embodiment of a stream distribution system relating to the present invention.

This stream distribution system includes a stream server device 201, a cache server device 202, and a plurality of terminal devices 203, 204, 205, . . . .

Stream server device 201 and cache server device 202, and cache server device 202 and terminal devices 203, 204 and the like are connected respectively via networks 206 and 207, which are the Internet, CATV or the like. Networks 206 and 207 may of course be the same network.

Stream server device 201 is, for example, owned by a content holder, and stores a large number of contents such as video, audio and the like.

Stream server device 201 includes a storage unit 211, a distribution request information receiving unit 212, a control unit 213, a header separation unit 214, and a data transmitting unit 215.

Storage unit 211 is formed from a hard disk or the like, and stores a large number of contents such as video, audio and so forth, the contents being distinguished by identifiers such as content name and the like, and encoded using an MPEG-4 format.

FIG. 3A shows in schematic form a section of a bitstream of a content stored in storage unit 211. This bitstream 301 shows a packet structure of a single VOP (video object plane), which is a basic unit of video data handled with MPEG-4. VOP 302 shown in bitstream 301 is structured from two video packets 303 and 304.

At the head of VOP 302 is a VOP_start_code 305, which is VOP start code information showing a head location of VOP 302. In the location following VOP_start_code 305 is a VOP header 306. In VOP header 306 is stored control information (e.g. frame height/breadth of image, time period differential from prior VOP, number of macroblocks or "MBs") for image reproduction.

Following VOP header 306 is video packet 303 and video packet 304. Video packets 303 and 304 are formed respectively from resynchronization markers 307 and 308, video packet headers 309 and 310, and MB encoded information 311 and 312, which are encoded MBs.

Here, with this bitstream 301, a video packet, for example, is treated as a transmit unit, and VOP_start_code 305 and VOP header 306 are treated as a single transmit unit.

Furthermore, in the overall bitstream 301, headers also appear in GOVs (group of VOPs; equivalent of GOP in MPEG-2), which are collections of VOPs, VOLs (video object layers), which are collections of GOVs, VOs (visual objects), which are collections of VOLs, and VOSs (visual object sequences), which are collections of VOs.

VOP_start_code 305 at the head of VOP 302 in bitstream 301 is shown by a unique bit string and defined as "0x000001B6".

Distribution request information receiving unit 212 notifies control unit 213 when distribution request information comprising a content name, a preset distribution time, and an IP address of cache server device 202 is received from cache server device 202 via network 206. Also, unit 212 notifies control unit 213 when header information distribution request information comprising the content name and the IP address is received from cache server device 202 in the same manner as above.

Control unit 213, when notification of distribution request information is received from distribution request information receiving unit 212, calculates, giving consideration to the bitstream data volume, the time required to transmit, prior to the preset distribution time, a bitstream, minus the header information, of the content name included in the distribution request information, out of the contents stored in storage unit 211. In this way, control unit 213 determines the distribution start time of the bitstream of the content name included in the distribution request information, and when the distribution start time is reached, control unit 213 notifies the content name to header separation unit 214 and instructs unit 214 to separate header information. At the same time, control unit 213 notifies a transmission instruction and the IP address of cache server device 202 to data transmitting unit 215.

Furthermore, control unit 213, when notification of header information distribution request information comprising the IP address and the content name is received from distribution request information receiving unit 212, notifies the content name to header separation unit 214 and instructs unit 214 to extract header information. At the same time, control unit 213 notifies a header information transmission instruction and the IP address of cache server device 202 to data transmitting unit 215.

Header separation unit 214 clears a transmission queue when notified of a content name by control unit 213 and instructed to separate header information. Next, of the contents stored in storage unit 211, unit 214 reads a bitstream of the notified content name in transmit packet units.

Here, MP4 packets in MP4 file format and RTP (realtime transport protocol) packets disclosed by RFC (request for comments) 3016 and the like are exemplary transmit packet unit.

An MP4 packet is structured from an MP4 header necessary for transmitting/receiving MPEG-4 bitstreams via a network, and an MP4 payload, which is a part of an MPEG-4 bitstream. MP4 payloads are constituted by VPs (video packets), VOP headers or the like.

An RTP packet is likewise structured from an RTP header and an RTP payload, and RTP payloads are constituted by VPs, VOP headers or the like.

Header separation unit 214 judges whether VOP_start_code 305 is included in a read packet. That is, unit 214 scans the packet and judges VOP_start_code 305 to be included when "0x000001B6" is inscribed. When not included, unit 214 queues the packet in the transmission queue as a transmission target.

When judged to be included, header separation unit 214 removes the VOP_start_code together with VOP header 306, which follows the VOP_start_code, inserts dummy data, and queues the packet in the transmission queue. At this time, unit 214 appends a flag in a predetermined location (e.g. the head) of the dummy data. Here, this flag is used in combining bitstreams in cache server device 202. Unit 214 conducts this processing until an end of the bitstream of the notified content name.

Next, header separation unit 214, when notified of the content name and instructed to extract header information by control unit 213, reads, from the bitstreams stored in storage unit 211, the bitstream specified by the content name, extracts a VOP_start_code and a VOP header, and notifies the extracted VOP_start_code and VOP header to data transmitting unit 215.

Data transmitting unit 215, when notification of an IP address of cache server device 202, which is the transmission target of the content, and a transmission instruction is received from control unit 213, sequentially reads elements, queued in the transmission queue by header separation unit 214, of a bitstream in which dummy data has been inserted in a location of VOP header 306 and the like, and transmits the read bitstream to cache server device 202 via network 206.

As shown in FIG. 3B, bitstream 301 stored in storage unit 211 is transmitted to cache server device 202 after being converted to bitstream 321. Dummy data 322 is inserted in bitstream 321 in an area of VOP_start_code 305 and VOP header 306 in bitstream 301. Video packets 303 and 304 remain unchanged.

Furthermore, data transmitting unit 215, when notified by control unit 213 of the IP address of cache server device 202 and a header information transmission instruction, transmits the header information and the like notified from header separation unit 214 to cache server device 202 via network 206.

Figure 5:
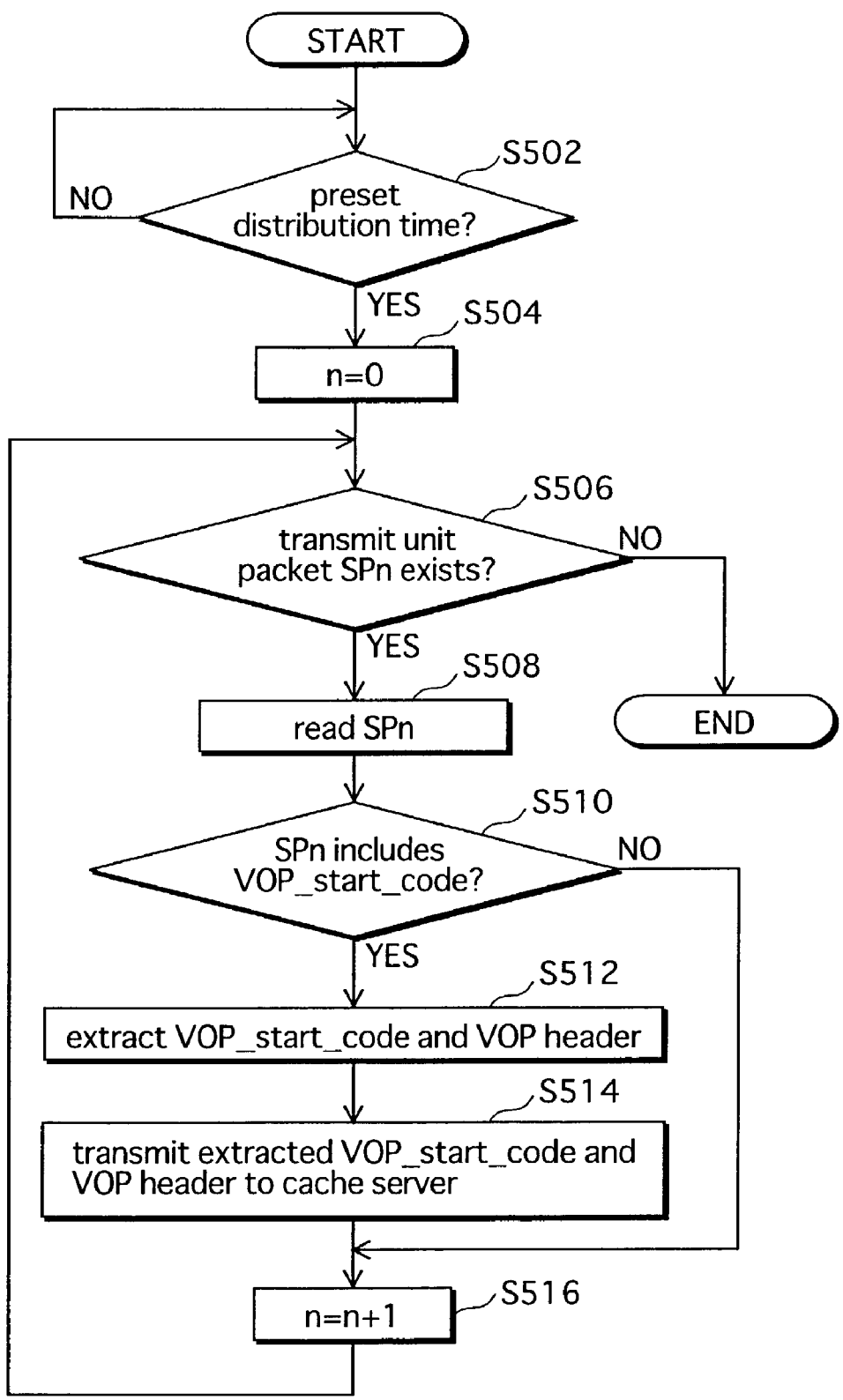
FIG. 5 is a flowchart depicting operations performed by the stream server device of the above embodiment to transmit a bitstream of header information.

The following description relates to the operations of stream server device 201 with reference to the FIGS. 4 and 5 flowcharts.

FIG. 4 is a flowchart depicting operations from the receipt of a content distribution presetting from cache server device 202 up until the preset distribution time.

First, control unit 213 receives notification of the preset distribution information of a content from cache server device 202 via distribution request information receiving unit 212. Header separation unit 214 waits for notification of a content name and a header separation instruction from control unit 213 (S402), resets a counter n to "0" (S404), and clears the transmission queue (S406).

Next, header separation unit 214 judges whether there exists a packet SPn, which is a transmit unit of a content bitstream stored in storage unit 211 (S408). If judged to exist, unit 214 reads packet SPn (S410) and judges whether a VOP_start_code is included in packet SPn (S412). If judged to be included, unit 214 inserts dummy data in an area of the VOP_start_code and the subsequent VOP header, turns on a flag in a predetermined location, and adds the packet to the transmission queue (S414).

Data transmitting unit 215 transmits the elements included in the transmission queue to cache server device 202 (S416).

Header separation unit 214 increments counter n by "1" (S418) and returns to S406.

If judged in S412 that a VOP_start_code is not included in packet SPn, header separation unit 214 adds packet SPn to the transmission queue (S420), increments counter n by "1" (S422) and returns to S408.

If judged in S408 that packet SPn to be read from a bitstream in storage unit 211 does not exist, data transmitting unit 215 transmits the elements in the transmission queue to cache server device 202 (S424) and ends the processing.

FIG. 5 is a flowchart depicting the operations of stream server device 201 on and after the preset distribution time.

Control unit 213 waits for the preset distribution time (S502) and sends an extraction instruction to header separation unit 214.

Header separation unit 214 resets counter n to "0" (S504), and judges whether there exists a packet SPn, which is a transmit unit of a bitstream in storage unit 211 to be read (S506). If judged to exist, unit 214 reads packet SPn (S508) and judges whether a VOP_start_code is included in packet SPn (S510).

If judged to be included, unit 214 extracts the VOP_start_code and the subsequent VOP header (S512).

Data transmitting unit 215 transmits the extracted VOP_start_code and VOP header to cache server device 202 (S514).

Header separation unit 214 adds "1" to counter n and returns to S506.

If judged in S510 that a VOP_start_code is not included, header separation unit 214 moves to S516.

If judged in S506 that packet SPn does not exist, header separation unit 214 ends the processing.

Figure 6A:
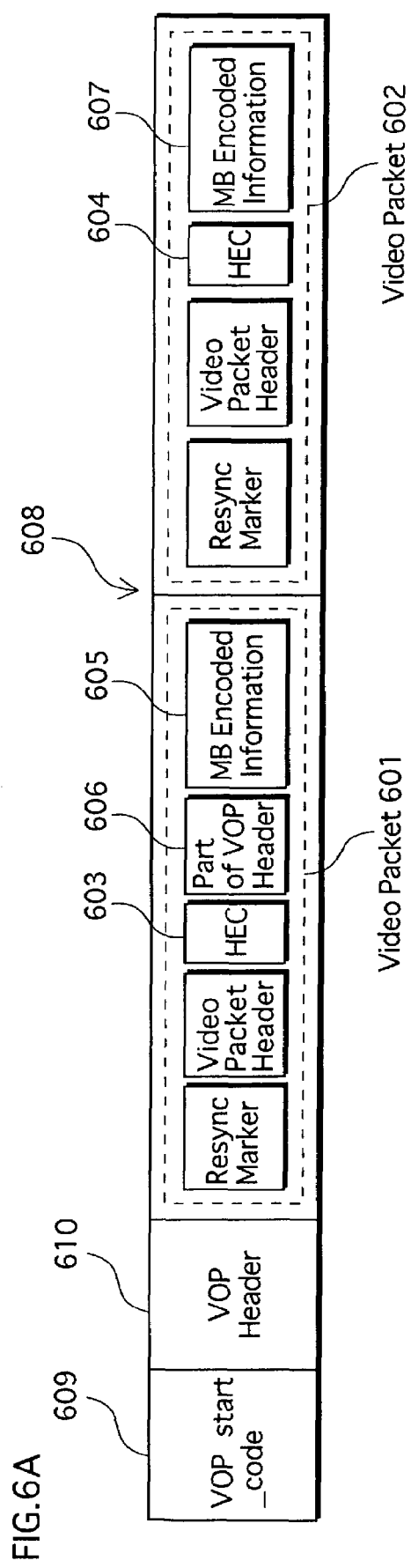
FIG. 6A is a schematic diagram of a further example of stream packets stored in a storage unit of a stream server device of the above embodiment.

Here, although in the description of the present embodiment, an HEC (header extension code) is not used in VOP packets, as shown in FIG. 6A, a VOP packet structure in which HECs 603 and 604 are used in video packets 601 and 602 is possible. In HEC 603 is inscribed a "1" and between HEC 603 and the following MB encoded information is inscribed a part of the VOP header 606. In HEC 604 is inscribed a "0" and then MB encoded information is inscribed without including a part of the VOP header.

In the case of bitstream 608, header separation unit 214 judges whether an HEC is included in a packet, and if included, whether "1" is inscribed in the HEC. If "1" is inscribed, unit 214 separates the part of the VOP header 606, and inserts dummy data into the area from which the part 606 was removed. Moreover, when dummy data (e.g. null information) is inserted, as described above, a flag is turned on in a predetermined location to show that the part of the VOP header 606 has been removed.

Figure 6B:
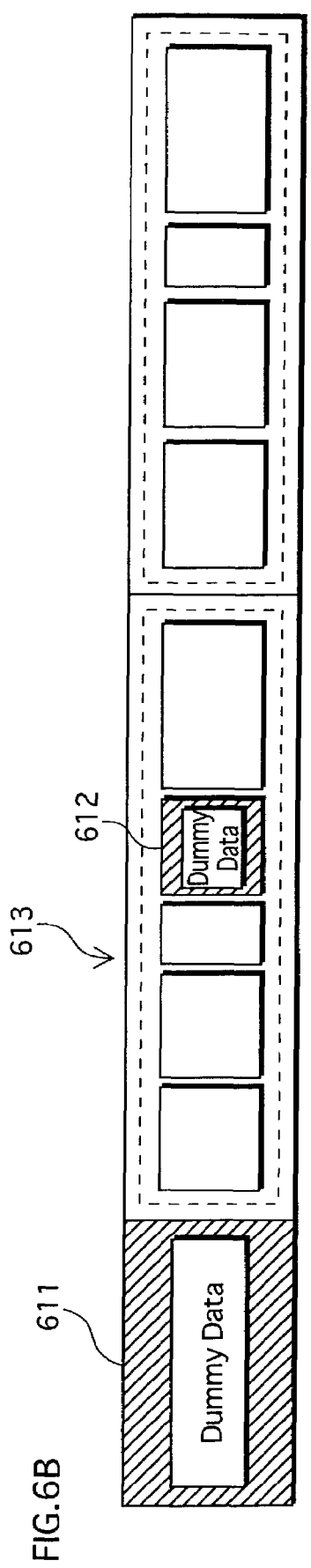
FIG. 6B shows stream packets transmitted to a cache server device, these stream packets being the stream packets shown in FIG. 6A having had header information removed by a header separation unit and replaced by dummy data.

Bitstream 613, shown in FIG. 6B, in which dummy data 611 and 612 has been inserted into an area of a VOP_start_code 609, a VOP header 610, and the part of the VOP header 606 of bitstream 608 is transmitted from data transmitting unit 215 to cache server device 202.

Furthermore, header separation unit 214, when header information is to be extracted, judges whether an HEC is used in a packet, and if used, whether "1" is inscribed in the HEC, and if "1", extracts a part of the VOP header, and notifies the extracted part to data transmitting unit 215.

At a preset distribution time, VOP_start_code 609, VOP header 610, the part of the VOP header 606 and so forth are transmitted from data transmitting unit 215 to cache server device 202.

Furthermore, while the present embodiment was described in relation to MPEG-4 format bitstreams, it is possible to also apply the present embodiment to MPEG-2 format bitstreams.

The following description relates to exemplary applications in the case of MPEG-2 format bitstreams with reference to FIGS. 7A and 7B and FIGS. 8A and 8B.

Figure 7A:
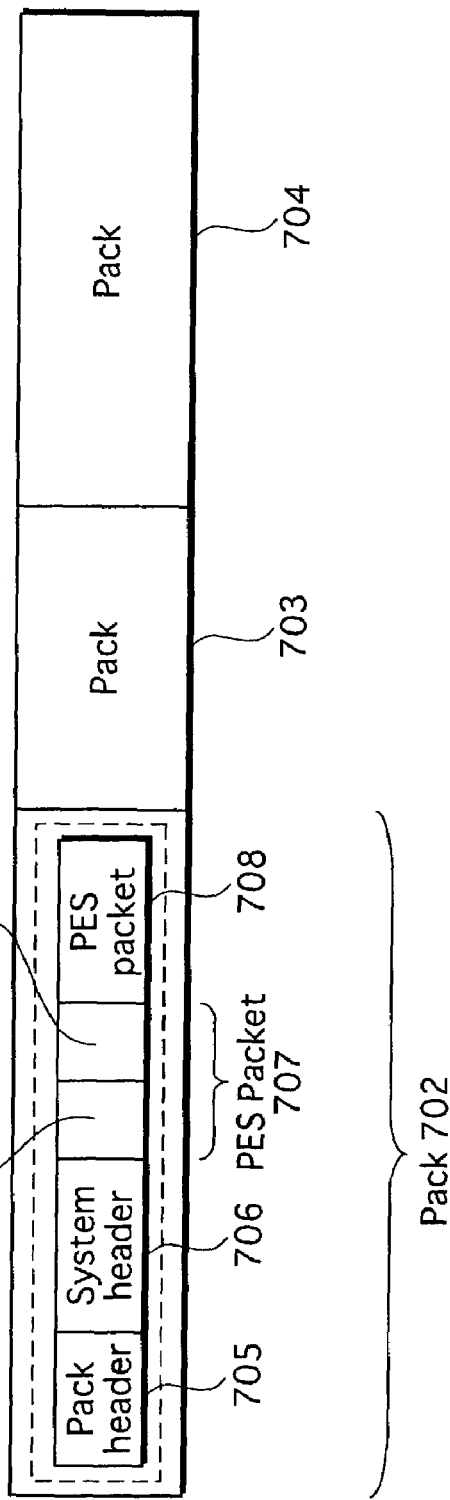
FIG. 7A schematically shows an exemplary packet structure of an MPEG-2 elementary stream format applicable to the above embodiment.

FIG. 7A shows a bitstream in which a content stored in storage unit 211 has an MPEG-PES (packetized elementary stream). A bitstream 701 has packs 702, 703 and 704. Pack 702 is formed from pack header 705, system header 706, and PES packets 707 and 708. PES packet 707 is formed from PES_packetheader 709 and elementary stream 710. Packet 708 is the same. Moreover, packs 703 and 704 also have the same structure as pack 702.

Figure 7B:
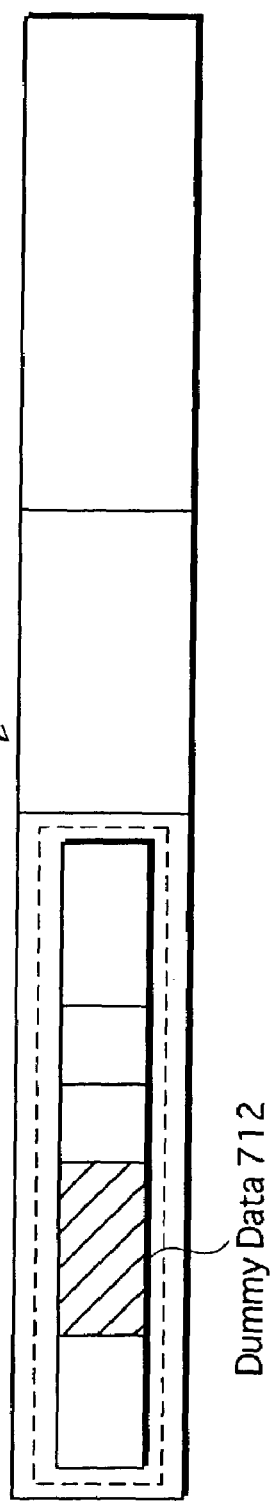
FIG. 7B shows header information of the bitstream shown in FIG. 7A having been replaced by dummy data when the bit stream is to be outputted from the stream server device.

In the case of bitstream 701, a bitstream 711 transmitted from data transmitting unit 215 to cache server device 202 prior to a preset distribution time has, as shown in FIG. 7B, dummy data 712 inserted by header separation unit 214in an area of system header 706 in bitstream 701.

Furthermore, when the preset distribution time is reached, system header 706 is extracted from packs 702, 703 and 704 by header separation unit 214 and transmitted from data transmitting unit 215 to cache server device 202.

Figure 8A:
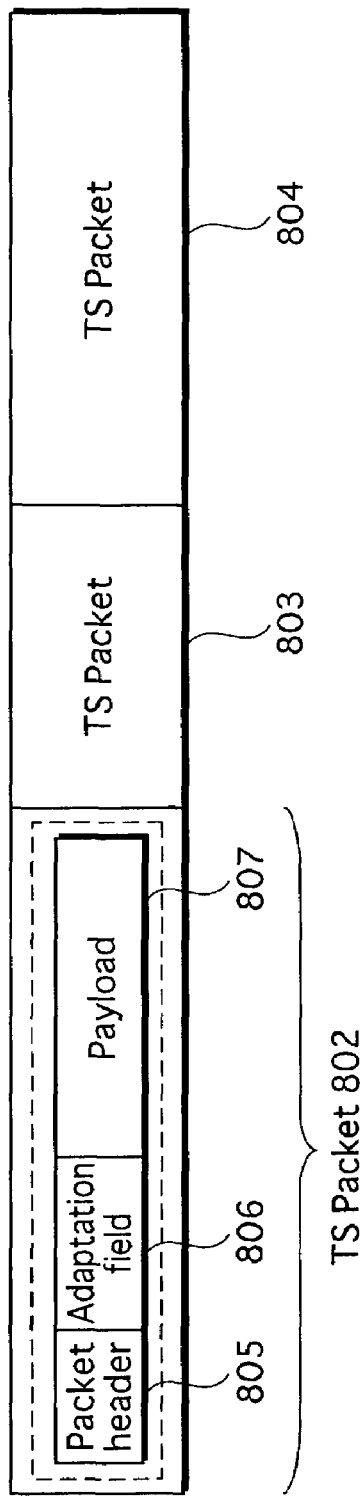
FIG. 8A shows an exemplary packet structure of an MPEG-2 transport stream format applicable to the above embodiment.

FIG. 8A shows an MPEG-TS (transport stream) format bitstream. This bitstream 801 is structured from fixed length TS packets 802, 803 and 804. TS packet 802 is formed from a packet header 805, an adaptation field 806 and a payload 807. TS packet 803 and 804 are structured in the same manner.

Figure 8B:
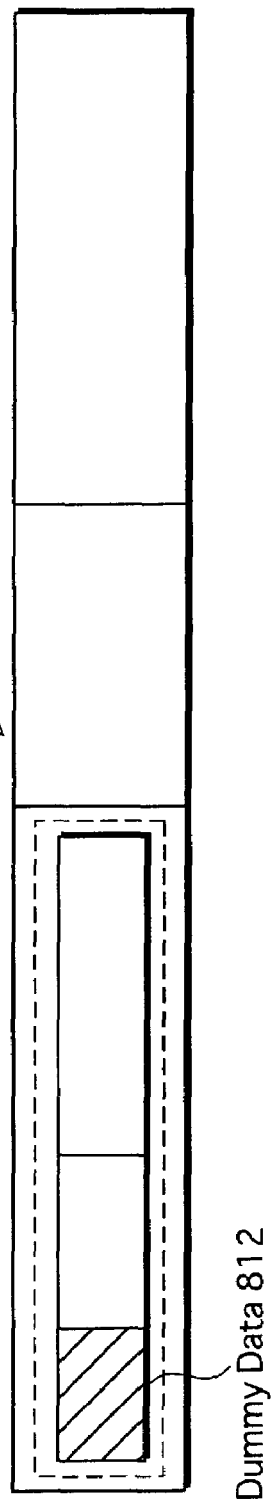
FIG. 8B shows header information of the bitstream shown in FIG. 8A having been replaced by dummy data when the bit stream is to be outputted from the stream server device.

FIG. 8B shows a bitstream transmitted from data transmitting unit 215 to cache server device 202 prior to a preset distribution time. Bitstream 811 has dummy data 812 inserted in an area of packet header 805 of bitstream 801.

Packet header 805 and so forth are transmitted to cache server device 202 at the preset distribution time.

The following description relates to cache server device 202.

Cache server device 202 is a server device owned, for example, by an Internet service provider (ISP), and performs as a relay device between stream server device 201 and terminal devices 203, 204, 205, . . . .

Cache server device 202 includes a presetting reception unit 221, a presetting transmission unit 222, a data receiving unit 223, a HDD 224, a RAM 225, a header combining unit 226, a bitstream transmitting unit 227 and a control unit 228.

Presetting reception unit 221 receives distribution request information from terminal devices 203, 204, 205, . . . . Received distribution request information is stored in a preset distribution information table.

FIG. 9 shows an exemplary distribution request information table. In distribution request information table 901 is inscribed terminal identifiers 902 identifying terminal device 203 and so forth, content identifiers 903 and preset distribution times 904.

In terminal identifiers 902 may be inscribed IP address. In content identifiers 903 is inscribed a content title, content number or the like of contents whose distribution is requested. In preset distribution times 904 is inscribed the date-time that users of terminal device 203 and the like wish to view contents.

Presetting reception unit 221, when distribution request information is received from terminal device 203 and the like, notifies the content name (i.e. content identifier 903) and preset distribution time to presetting transmission unit 222.

Presetting transmission unit 222 transmits, to stream server device 201 via network 206 as distribution request information, the IP address of cache server device 202, and the content name and preset distribution time notified by presetting reception unit 221. Moreover, presetting transmission unit 222, when times inscribed in preset distribution times 904 are reached, transmits header information distribution requests that include content names to stream server device 201.

Data receiving unit 223, when a bitstream in which dummy data has been inserted for header information by stream server device 201, writes the received bitstream into HDD 224. At this time, the bitstream is written into HDD 224 so as to be identifiable by content name or the like.

Furthermore, data receiving unit 223, when a bitstream of header information and the like is received from stream server device 201, stores the received bitstream in RAM 225.

HDD 224 is formed from a storage member such as a nonvolatile hard disk or the like, and stores content bitstreams in which dummy data has been inserted in place of header information. Since header information necessary for playback is lacking from these bitstreams, the original images of a content cannot be played by playing back these bitstreams. It is thus possible to realize copyright protection, because contents cannot be played until the preset distribution time.

RAM 225 is formed from a storage member such as a volatile semiconductor memory or the like, and stores header information indispensable for playback of content bitstreams stored in HDD 224.

Header combining unit 226, when a combine bitstream instruction is received from control unit 228, reads header $HD_m$ stored in RAM 225 instead of a receive unit packet $RP_n$ stored in HDD 224 in which dummy data has been inserted, and notifies bitstream transmitting unit 227.

Figure 10:
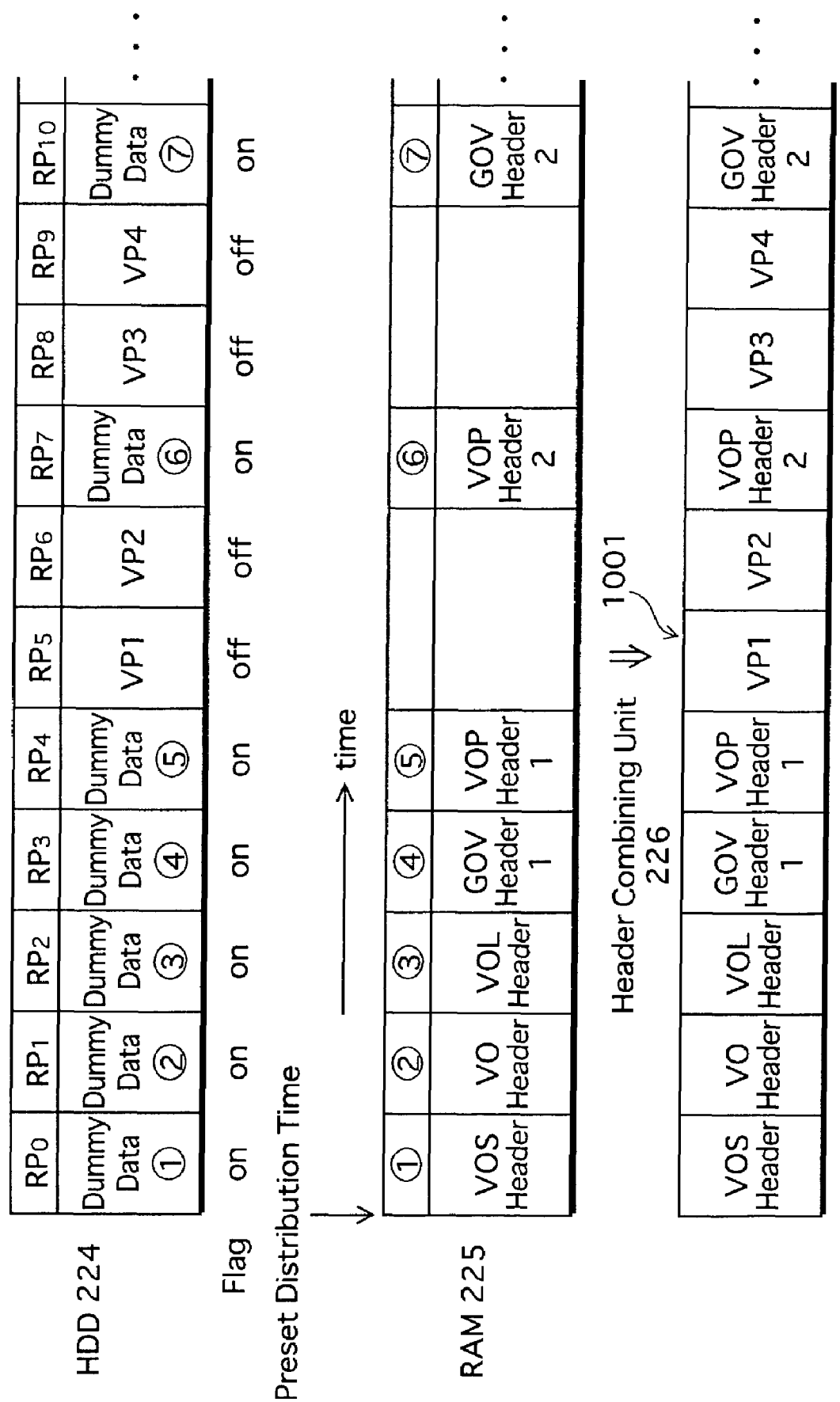
FIG. 10 is a schematic diagram for depicting processing by a header combining unit in the cache server device of the above embodiment.

FIG. 10 is a schematic diagram for depicting processing by header combining unit 226.

Here, although in the above stream server device 201, header separation unit 214 is described as separating a VOP_start_code and a subsequent VOP header, the following is described in terms of a VOS header, a VO header, a VOL header, and a GOV header having also been separated.

The top rung of FIG. 10 shows receive unit packets $RP_0$, $RP_1$, $RP_2$, ..., $RP_{10}$, ... stored in HDD 224. These receive unit packets $RP_n$ correspond to transmit unit packets $SP_n$ of stream server device 201.

Dummy data is inserted in packets $RP_0$, $RP_1$, $RP_2$, ..., $RP_{10}$, and flags are turned on. The encircled numerals (i.e. ①) etc.) below each piece of dummy data indicate that the dummy data replaces a corresponding header.

The middle rung of FIG. 10 shows headers $HD_m$ received by data receiving unit 223 and to be stored in RAM 225. When a preset distribution time is reached, the VOS header is written into RAM 225, after which the subsequent VO header and so forth are written into RAM 225. Between VOP header 1 and VOP header 2, and between VOP header 2 and GOV header 2 is left black to show that nothing is received in these timeslots.

Header combining unit 226 sequentially notified a bitstream 1001 to bitstream transmitting unit 227, so as to replace the dummy data of receive unit packets $RP_n$ with headers $HD_m$ written into RAM 225.

Bitstream transmitting unit 227, when notification of a terminal identifier identifying transmission target terminal device 203 and the like is received from control unit 228, sequentially transmits the bitstream formed from headers $HD_m$ and receive unit packets $RP_m$ notified by header combining unit 226 to terminal device 203 and the like via network 207.

Control unit 228 monitors preset distribution times inscribed in distribution request information table 901 by presetting reception unit 221, and when a preset distribution time is reached, unit 228 sends a combine bitstream instruction to header combining unit 226, and notifies the terminal identifiers of terminal device 203 and the like, which are transmission targets, to bitstream transmitting unit 227.

Figure 11:
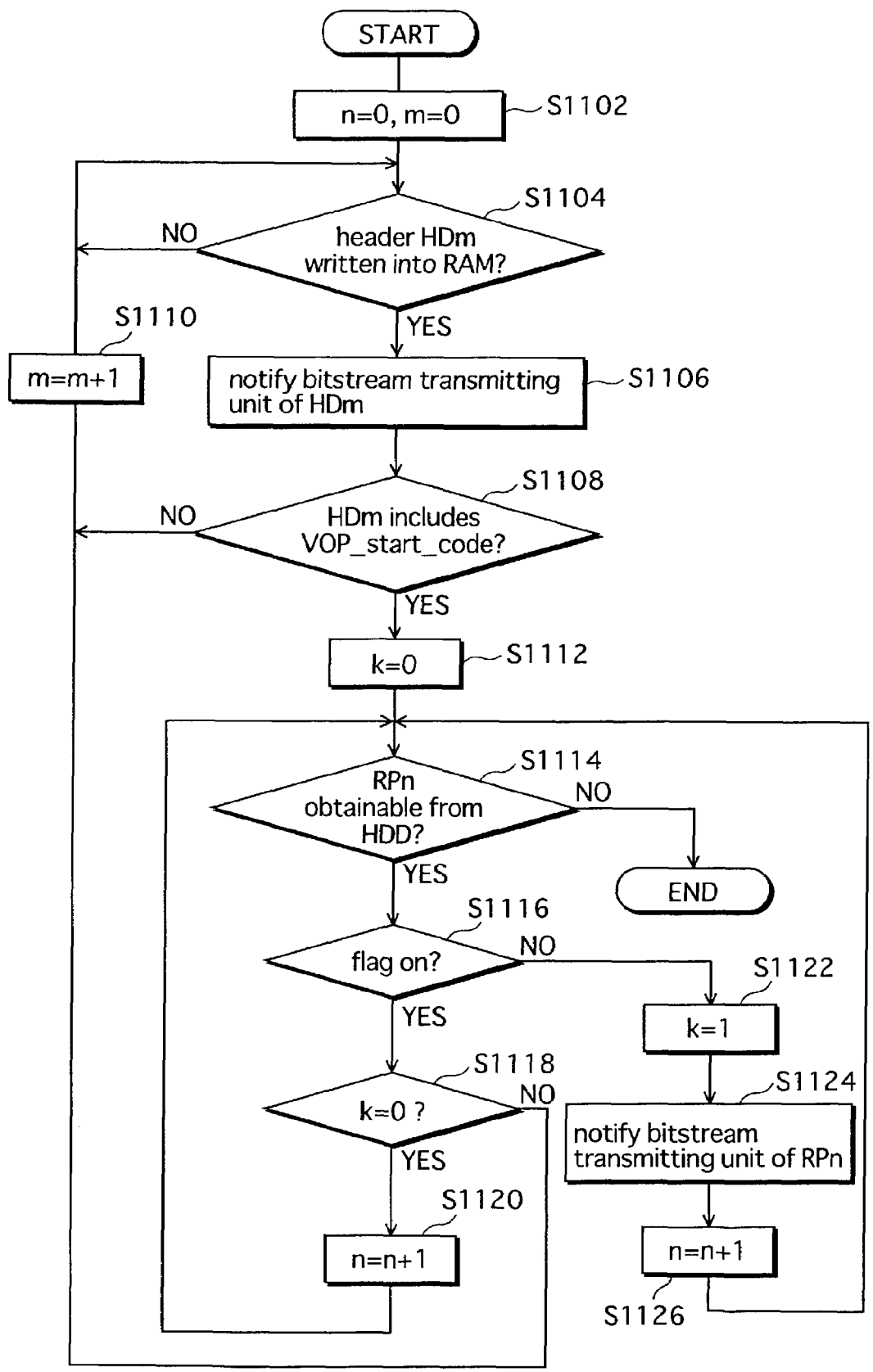
FIG. 11 is a flowchart depicting the main operations performed by the cache server device of the above embodiment.

The following description relates to the main operations of cache server device 202 with reference to the FIG. 11 flowchart.

Header combining unit 226, when a combine bitstream instruction is received from control unit 228, resets a counter n and a counter m to "0" (S1102), and waits for header $HD_m$ to be written into RAM 225 (S1104). Unit 226 reads header $HD_m$ written into RAM 225, and notifies the read header $HD_m$ to bitstream transmitting unit 227 (S1106). Bitstream transmitting unit 227 transmits, via network 207, the notified header $HD_m$ to terminal device 203 and the like identified by terminal identifiers.

Header combining unit 226 judges whether header $HD_m$ includes a VOP_start_code (S1108), and if not included, increments counter m by "1" (S1110) and returns to S1104.

If judged in S1108 that header $HD_m$ includes a VOP_start_code, header combining unit 226 sets a constant k to "0". Next, unit 226 judges whether there is a receive unit packet $RP_n$ in HDD 224 (S1114), and ends the processing if not.

If a receive unit packet $RP_n$ does exist, header combining unit 226 obtains packet $RP_n$, and judges whether there is an on-flag in a predetermined location (S1116). If there is an on-flag, unit 226 judges whether constant k is "0" (S1118), and if "0", unit 226 adds "1" to counter n (S1120) and returns to S1114. If not "0", unit 226 adds "1" to counter m (S1120) and returns to S1104.

Header combining unit 226, when judged in S1116 that the flag is not on, sets constant k to "1" (S1122), and notifies receive unit packet $RP_n$ to bitstream transmitting unit 227. Bitstream transmitting unit 227 transmits, via network 207, notified packet $RP_n$ to terminal device 203 and the like identified by terminal identifiers.

Header combining unit 226 then adds "1" to counter n (S1126) and returns to S1114.

The following description relates to terminal device 203. Terminal devices 204, 205, ... also have the same structure as terminal device 203.

Terminal device 203 is constituted by information equipment such as a PC, a STB, a PDA, a mobile telephone and the like.

Terminal device 203 includes an input unit 231 formed from a keyboard, a pointing device (mouse, etc.) and so forth, a transmit/receive control unit 232 that is connected to cache server device 202 via network 207, and a display unit 233 such as a monitor or the like that displays the images of contents.

Input unit 231 receives input of content names that users wish to have distributed and date-times (preset distribution times) desired for distribution, and notifies transmit/receive control unit 232.

Here, input of a content name may be carried out by having display unit 233 display a list of contents stored in storage unit 211 of stream server device 201, and having a user choose from this list. In this case, content numbers or the like may be inputted instead of content names.

Here, data for displaying in the list of contents may be requested of cache server device 202 and received by transmit/receive control unit 232, or distributed in advance to terminal device 203 and the like.

Transmit/receive control unit 232, when notification of a content name and a preset distribution time is received from input unit 231, transmits distribution request information to which the IP address of terminal device 203 is appended to cache server device 202 via network 207.

Transmit/receive control unit 232, when a preset distribution time is reached, receives a content bitstream from cache server device 202. Unit 232 decodes the received bitstream and has content images displayed on a monitor of display unit 233 and audio outputted.

Second Embodiment

Figure 12:
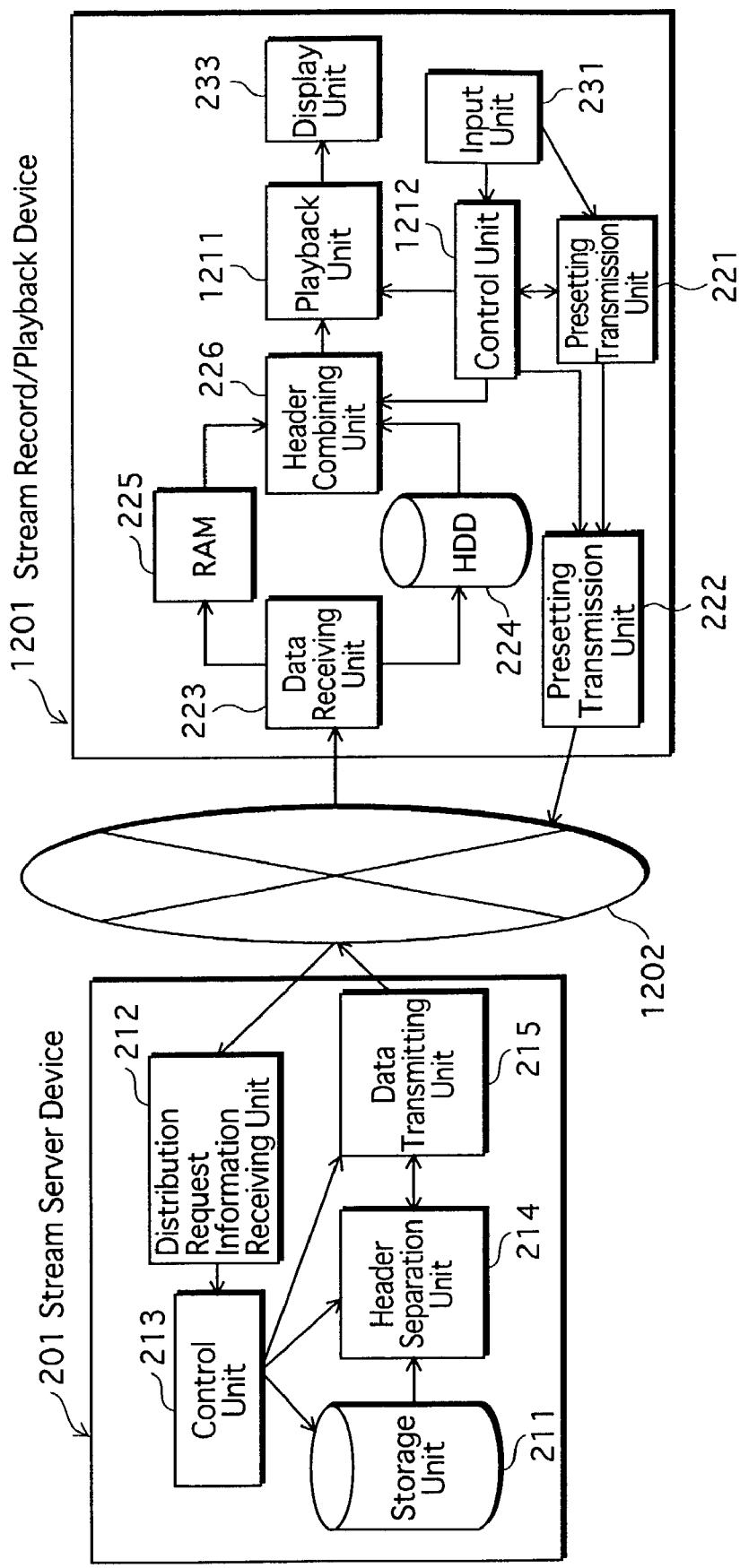
FIG. 12 is a structural diagram of a second embodiment of the stream distribution system relating to the present invention.

FIG. 12 is a structural diagram of a second embodiment of the stream distribution system relating to the present invention. This stream distribution system is connected to stream server device 201 and a stream record/playback device 1201 via a network 1202.

Stream record/playback device 1201 results from combining of cache server device 202 and terminal device 203 of the first embodiment. Here, although a plurality of stream record/playback devices 1201 is connected to network 1202, these have been omitted from the drawing.

Structures substantially the same as structures in the first embodiment have appended the same numbering, and the description relates to structures unique to the present embodiment while omitting description of similar structures.

Header separation unit 214 in stream server device 201 stores a header information elimination table.

FIG. 13 shows an exemplary header information elimination table. In header information elimination table 1301 is stored header information elimination levels 1303 in correspondence with content names 1302.

These header information elimination levels 1303 are set in advance by content holders in accordance with content names.

For example, a "content A" is a popular movie recently released at movie theaters. In this case, header separation unit 214 sets the header information elimination level to "1", removes all of the header information, and transmits a bitstream from which the header information has been eliminated prior to a preset distribution time in the same manner as the first embodiment.

A "content B" is a movie that a content holder wants to sell to a user (i.e. content holder is prepared to allow the user to view a free preview, but wants to charge a fee to view the whole movie).

In this case, the header information of an area (time) to be previewed is included (i.e. not separated) in a content bitstream transmitted prior to a preset distribution time. Header information in areas other than that to be previewed is separated. In this case, header separation unit 214 specifies this area as header information elimination level "2".

Furthermore, a "content C" is a movie released in theaters awhile back, the content holder being prepared to allow the user to view this movie for free. In this case, the header information elimination level is set to "3" and a content bitstream is transmitted with all of the header information included.

Here, although the header information elimination level was described as being from "1" to "3", smaller classifications are of course possible.

Header separation unit 214, when a content name and header information separation instruction is received from control unit 213, refers to header information elimination table 1301, and, depending on the content name, separates the header information in accordance with the header information elimination level.

Furthermore, header separation unit 214, when a header information extraction instruction is received, is not required to extract header information already included in a content bitstream that has been transmitted.

Here, when a content bitstream having a header information elimination level of "2" or "3" is received by stream record/playback device 1201, it is possible to view images of preview areas and free images prior to a preset distribution time.

The operations of stream record/playback device 1201 will now be briefly described.

In relation to a content having a header information elimination level of "1" in header information elimination table 1301, the same processing is conducted at that of the FIG. 4 and 5 flowcharts in the first embodiment.

In relation to a content having a header information elimination level of "3", header separation unit 214 notifies data transmitting unit 215 of the bitstream read from storage unit 211 without separating header information. Consequently, normal transmission of the content bitstream is conducted.

Furthermore, in relation to a content having a header information elimination level of "2", processing for a header information elimination level of "3" is conducted with respect to a preview area, and processing for a header information elimination level of "1" is conducted with respect to areas other than the preview area.

The following description relates to stream record/playback device 1201.

Stream record/playback device 1201 includes input unit 231, presetting reception unit 221, presetting transmission unit 222, data receiving unit 223, HDD 224, RAM 225, header combining unit 226, a playback unit 1211, display unit 233, and a control unit 1212.

A content name and a preset distribution time received by input unit 231 are notified to presetting transmission unit 222 via presetting reception unit 221. Distribution request information table 901 of the first embodiment stored by presetting reception unit 221 is, in the present embodiment, stored instead by control unit 213 in stream server device 201.

Presetting transmission unit 222 transmits distribution request information formed from a content name, a preset distribution time, an identifier identifying stream record/playback device 1201 (e.g. an IP address) to stream server device 201 via network 1202.

Furthermore, presetting transmission unit 222, when a preset distribution time is reached, transmits a distribution request for header information to the stream server device via network 1202 as a result of an instruction from control unit 1212.

Header combining unit 226 sequentially notifies a bitstream that combines header $HD_m$ obtained from RAM 225 and receive unit packet $RP_n$ obtained from HDD 224 to playback unit 1211.

Here, when the distribution of a content having a header information elimination level of "2" or "3" is requested, even if prior to the preset distribution time, header combining unit 226 reads the bitstream stored in HDD 224, and when outputted to playback unit 1211 it is possible to playback a part or all of the content.

Playback unit 1211 decodes the bitstream notified from header combining unit 226 and outputs the decoded bitstream to display unit 233.

Display unit 233 displays images of the content decoded by playback unit 1211 on a monitor and outputs audio.

Control unit 1212, when a playback instruction for a content having a header information elimination level of "2" or "3" is received from input unit 231, instructs header combining unit 226 to read the bitstream stored in HDD 224.

Furthermore, control unit 1212, when the preset distribution time is reached, instructs presetting transmission unit 222 to request distribution of header information.

Control unit 1212 additionally instructs header combining unit 226 to replace dummy data inserted into the bitstream with header information, and also sends a playback instruction to playback unit 1211.

The operations of stream record/playback device 1201 will now be briefly described.

Apart from the following changes to S1106 and S1124, the processing is substantially the same as that of the FIG. 11 flowchart depicting the operations of the cache server device in the first embodiment.

In S1106, header combining unit 226 notifies a bitstream of header $HD_m$ to playback unit 1211.

In S1124, header combining unit 226 notifies a bitstream of receive unit packet $RP_n$ to playback unit 1211.

Playback unit 1211 decodes a notified bitstream and outputs the decoded bitstream to display unit 233.

Here, a content having a header information elimination level of "1" in header information elimination table 1301 is played as a result of the above operations. Areas other than a preview area of a content having a header information elimination level of "2" are also played by the above operations.

The preview area of a content having a header information elimination level of "2" and a content having a header information elimination level of "3" may be processed in the same manner as for normal playback of stored contents, since header information is already included in the content bitstreams in HDD 224, and is not written into RAM 225.

Here, although the above embodiments are described in terms of header information being transmitted from stream server device 201 at the preset distribution times of VODs, the present invention is not limited to the preset distribution of VODs.

For example, in the case of Internet broadcasts at predetermined times, a content bitstream minus the header information may be transmitted from stream server device 201 prior to a predetermined time and stored in HDD 224 provided in stream record/playback device 1201, and then a header information bitstream may be transmitted to cache server device 202 or stream record/playback device 1201 on or after the predetermined time. In this way, out of a carrier transmitted after being divided into 13 segments according to, for example, OFDM (orthogonal frequency division multiplexing), a content bitstream can be stored, prior to a predetermined time, in HDD 224 over an extended time period using one segment, and a header information bitstream can be transmitted realtime at the predetermined time using this one segment.

As a result, it is possible to provide a high image quality broadcast by effectively using narrowband.

In this case, a broadcast time set by stream server device 201 becomes the predetermined time, without needing to receive a preset distribution time distribution time from terminal device 203 and the like, or stream record/playback device 1201.

Furthermore, although the above embodiments are described in terms of stream server device 201 transmitting a content bitstream minus the header information to cache server device 202 or stream record/playback device 1201 via networks 206 or 1202 prior to a predetermined time, a content bitstream minus the header information may be recorded onto a portable recording medium (e.g. DVD, etc.), and the recording medium may be distributed in advance to cache server device 202 or stream record/playback device 1201. Cache server device 202 or stream record/playback device 1201 may then mount this recording medium therein, receive a header information bitstream transmitted from stream server device 201 via network 206 or 1202 respectively, combine the bitstream recorded onto the recording medium from which the header information has been removed with the received bitstream, and playback the content.

Furthermore, instead of transmitting a bitstream of header information at a predetermined time, the header information bitstream may also be recorded onto another portable recording medium and distributed, for example, to a content procurer. Then, for example, in stream record/playback device 1201 of the content procurer, the bitstreams recorded onto these two recording mediums may be combined and the content played. In this way, in addition to lightening the load on the content procurer, it is possible, for example, for stream server device 201 to monitor the viewing the content by those other than the content procurer, and thus to lighten the load on stream server device 201 and effect copyright protection. The same applies in relation to cache server device 202.

Furthermore, although the encoding of contents is not mentioned in the above embodiments, a decoding key and an encoding key may be held respectively between stream server device 201 and cache server device 202, contents and header information may be encoded by stream server device 201, temporarily decoded by cache server device 202 before being encoded again and transmitted to terminal devices 203, 204, 205, . . . , and then decoded by terminal devices 203, 204, 205, . . . .

Also, an encoding key and a decoding key may be held respectively between stream server device 201 and stream record/playback device 1201, making it possible for stream record/playback device 1201 to decode contents and header information encoded by stream server device 201.

Furthermore, although the structures of the above embodiments are shown in the FIGS. 2 and 12 structural diagrams, the present invention may be realized by a computer program that has a computer exhibit the functions of the various structural elements.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A stream distribution system comprising a stream server device that transmits a stream, a plurality of terminal devices that playback a received stream, and a cache server device that mediates between the stream server device and the terminal devices via a network, the stream server device including:
   a first storage unit storing a stream composed of a content and control information necessary for the playback of the content, wherein the stream cannot be played without the control information, the control information including information regarding frame height, time period different from prior VOP, and number of macroblocks;
   a separating unit separating the stream into the content and the control information; and
   a time acquisition unit acquiring, the cache server device, distribution request information including a preset distribution time at which the content starts being distributed;
   a first stream transmitting unit transmitting the content to the cache server device before the preset distribution time indicated be the distribution request information, and to transmit the control information to the cache server device when the preset distribution time is reached, and
   the cache server device including:
   a time notifying unit transmitting the distribution request information to the stream server device;
   a receiving unit receiving the content and the control information;
   a second storage unit storing the content upon receipt thereof;
   a combining unit restoring the stream by combining the content stored by the second storage unit with the control information received by the receiving unit; and
   a second stream transmitting unit transmitting, when the stream has been restored by the combining unit, a stream that results from the restoration by the combining unit to one or more of the terminal devices, the transmitted stream being the same as the stream stored by the stream server device.

2. The stream distribution system of claim 1, further comprising another cache server device for mediating between the stream server device and the terminal devices via a network.

3. A stream server device in a stream distribution system having the stream server device, which stores a stream that includes a content and control information necessary for image playback of the content, a plurality of terminal device that playback a received stream, and a cache server device that mediates between the stream server device and the terminal devices via a network, comprising:

a separating unit separating a stream of control information from the stored stream, wherein the stored stream cannot be played without the stream of control information, the stream of control information including information regarding from height, time period differential from prior VOP, and number of macroblocks;

a time acquisition unit acquiring, from the cache server device, distribution request information including a preset distribution time at which the content starts being distributed; and a stream transmitting unit transmitting the stream from which control information has been removed to the cache server device before the preset distribution time indicated by the distribution request information, and to transmit the stream of control information to the cache device when the preset distribution time is reached.

4. The stream server device of claim 3, wherein
the control information is header information, and
the separating unit separates a stream of header information from the stored stream.

5. The stream server device of claim 4, wherein
the stored stream is an MPEG-4 format bitstream,
the separating unit separates a VOP start code and VOP header from the bitstream, and
the stream transmitting unit transmits the bitstream from which the VOP start code and the VOP header have been removed to the cache server device before the preset distributed time, and transmits the VOP start code and the VOP header to the cache server device when the preset distribution time is reached.

6. The stream server device of claim 4, wherein
the separating unit includes:
a dummy data inserting subunit, when the stream of header information has been separated from the stored stream, to insert dummy data into an area in the stream from which the header information was removed, and
the stream transmitting unit transmits the stream which has dummy data inserted in place of the header information to the cache server device before the preset distribution time.

7. The stream server device of claim 6, wherein
the separating unit further includes:
a flag subunit turning on, in a predetermined location of the dummy data, a flag showing that header information has been replaced.

8. The stream server device of claim 4, wherein
the stored stream is one of an MPEG-1 and an MPEG-2 format bitstream, and
the separating unit separates a system header from the bitstream.

9. The stream server device of claim 4, wherein
the stored stream is one of an MPEG-1 and an MPEG-2 format bitstream, and
the separating unit separates a packet header from the bitstream.

10. The stream server device of claim 3, wherein
the stream server device comprises:
a distribution information reception unit receiving from the cache server device, distribution information that includes a content identifier.

11. The stream server device of claim 3, wherein
the stream transmitting unit includes:
a narrowband transmission subunit transmitting, over an extended time period, the stream from which control information has been removed to the cache server device before the broadcast time, and to transmit, in realtime over a narrowband, the stream of control information to the cache server device when the preset distribution time is reached.

12. A cache server device in a stream distribution system having a stream server device that stores streams which include contents and control information necessary for image playback of the contents, a plurality of terminal devices that playback received streams, and one or more of the cache server devices, each of which mediates between the stream server device and the terminal devices via a network, comprising:

a time notifying unit transmitting to the stream server device a distribution request information indicating a preset distribution time at which the contents are permitted to be played;

a receiving unit receiving a stream from which control information has been removed and a stream of control information, wherein the stream cannot be played without the control information, the control including information regarding frame height, time period different from prior VOP, and number of macroblocks;

a storage unit storing the received stream from which control information has been removed;

a combining unit combining the received stream of control information with the stream stored by the storage unit; and a stream transmitting unit transmitting a stream that results from the combining by the combining unit to one or more of the terminal devices.

13. The cache server device of claim 12, further comprising:

a preset distribution information receiving unit receiving from each terminal device, preset distribution information that includes a content identifier of a content whose distribution is requested by the terminal device, the preset distribution time, and a terminal identifier of the terminal device; and a distribution information transmitting unit transmitting to the stream server device, distribution information that includes the content identifier, and a cache server identifier of the cache server device, wherein the receiving unit receives the stream from which control information has been removed before the preset distribution time, and receives the stream of control information when the preset distribution time is reached, and the stream transmitting unit transmits the stream to the terminal device identified by the terminal identifier in the received preset distribution information.

14. The cache server device of claim 13, wherein
the control information is header information,
a stream having dummy data inserted in an area of the header information is stored in the storage unit, and
the combining unit includes:
a header information acquiring subunit acquiring the stream of header information received by the receiving unit; and
a header information replacing subunit replacing the dummy data included in the stored stream with the acquired stream of header information.

15. The cache server device of claim 14, wherein
the stored stream is MPEG-4 format bitstream,
a VOP start code and a VOP header are included in at least one of the acquired pieces of header information,
flags in the pieces of dummy data are on,
the header information acquiring unit judges, for each piece of acquired header information, whether the VOP start code is included, and
the header information replacing unit, when judged that the VOP start code is included, replaces a corresponding piece of dummy data whose flag is on with the VOP start code and the VOP header.

16. A stream distribution system comprising a stream server device that stores a stream which includes a content and control information necessary for image playback of the content, and a plurality of stream record/playback devices that are connected via a network, the stream server device including:
   a separating unit separating a stream of control information from the stored stream, wherein the stored stream cannot be played without the stream of control information, the stream of control information including information regarding frame height, time period differential from prior VOP, and number of macroblocks;
   a time acquisition unit acquiring, form the cache server device, distribution request information including a preset distribution time at which the stream starts being distributed; and
   a stream transmitting unit transmitting the stream from which control information has been removed to one or more of the stream record/playback devices before the present distribution time, and to transmit the stream of control information to the one or more stream record/playback devices when the preset distribution time is reached, and
the stream record/playback devices each including:
   a receiving unit receiving the stream from which control information has been removed and the stream of control information;
   a storage unit storing the received stream from which control information has been removed;
   a combining unit combining the received stream of control information with the stream stored by the storage unit; and
   a stream playback unit playing back a stream that results from the combining by the combining unit, the played stream being the same as the stream stored by the stream server device.

17. A stream server device in a stream distribution system having the stream server device, which stores a stream that includes a content and control information necessary for image playback of the content, and a plurality of stream record/playback devices that are connected via a network, comprising:
   a separating unit separating a stream of control information from the stored stream, wherein the stored stream cannot be played without the stream of control information, the stream of control information including information regarding frame height, time period differential from prior VOP, and number of macroblocks;
   a time acquisition unit acquiring, from the cache server device, distribution request information including a preset distribution time at which the stream starts being distributed; and
   a stream transmitting unit transmitting the stream from which control information has been removed to one or more of the stream record/playback devices before the present distribution time, and to transmit the stream of control information to the one or more stream record/playback devices when the preset distribution time is reached.

18. The stream server device of claim 17, wherein
the control information is header information elimination table that includes,
the stream server device has a header information for each content, a header information elimination level, and
the separating unit separates header information in accordance with the header information elimination level of each content.

19. A stream record/playback device in a stream distribution system having a stream server device that stores a stream which includes a content and control information necessary for image playback of the content, and a plurality of the stream record/playback devices, which are connected via a network, comprising:
   a receiving unit receiving a stream from which control information has been removed and a stream of control information, wherein the stream cannot be played without the control information, the control information including information regarding frame height, time period differential from prior VOP, and number of macroblocks;
   a storage unit storing the received stream from which control information has been removed;
   a combining unit combining the received stream of control information with the stream stored by the storage unit; and
   a stream playback unit playing back a stream that results from the combining by the combining unit, the played stream being the same as the stream stored by the stream server device.

20. A stream distribution method of a stream distribution system having a stream server device that stores a stream which includes a content and control information necessary for image playback of the content, a plurality of terminal devices that playback a received stream, and a cache server device that mediates between the stream server device and the terminal devices via a network, comprising:
   a separating step in the stream server device of separating a stream of control information from the stored stream, wherein the stored stream cannot be played without the stream of control information, the stream of control information including information regarding frame height, time period differential from prior VOP, and number of macroblocks;
   a time acquisition step in the stream server device of acquiring from the cache server device, distribution request information including a preset distribution time at which the stream starts being distributed;
   a first stream transmitting step in the stream server device of transmitting the stream from which control information has been removed to the cache server device before the the preset distribution time indicated by the distribution request information, and transmitting the stream of control information to the cache server device when the preset distribution time is reached;
   a time notifying step in the cache server device of transmitting to the stream server device the distribution request information;
   a receiving step in the cache server device of receiving the stream from which control information has been removed and the stream of control information;

a storage step in the cache server device of storing the received stream from which control information has been removed;

a combining step in the cache server device of combining the received stream of control information with the stream stored in the storage step; and a second stream transmitting step in the cache server device of transmitting a stream that results from the combining in the combining step to one or more of the terminal devices, the transmitted stream being the same as the stream stored by the stream server device.

21. A stream distribution method of a stream server device in a stream distribution system having the stream server device, which stores a stream that includes a content and control information necessary for image playback of the content, a plurality of terminal devices that playback a received stream, and a cache server device that mediates between the stream server device and the terminal devices via a network, comprising:

a separating step of separating a stream of control information from the stored stream, wherein the stored stream cannot be played without the stream of control information the stream of control information including information regarding frame height, time period differential from prior VOP, and number of macroblocks;

a time acquisition step of acquiring from the cache server device, distribution request information including a preset distribution time at which the content starts being distributed; and a stream transmitting step of transmitting the stream from which control information has been removed to the cache server device before the preset distribution time indicated by the distribution request information, and transmitting the stream of control information to the cache server device when the preset distribution time is reached.

22. A stream transmit/receive method of a cache server device in a stream distribution system having a stream server device that stores a stream which includes a content and control information necessary for image playback of the content, a plurality of terminal devices that playback a received stream, and one or more of the cache server devices, each of which mediates between the stream server device and the terminal devices via a network, comprising:

a time notifying step of transmitting to the stream server device a distribution request information including a preset distribution time at which the content starts being distributed;

a receiving step of receiving a stream from which control information has been removed and a stream of control information, wherein the stream cannot be played without the stream of control information, the stream of control information including information regarding height, time period differential from prior VOP, and number of macroblocks;

a storage step of storing the received stream from which control information has been removed;

a combining step of combining the received stream of control information with the stream stored in the storage step; and a stream transmitting step of transmitting a stream that results from the combining in the combining step to one or more of the terminal devices, the transmitted stream being the same as the stream stored by the stream server device.

23. A stream distribution method of a stream distribution system having a stream server device that stores a stream which includes a content and control information necessary for image playback of the content, and a plurality of stream record/playback devices that are connected via a network, comprising:

a separating step in the stream server device of separating a stream of control information from the stored stream, wherein the stored stream cannot be played without the stream of control information, the stream of control information including information regarding frame height, time period differential from prior VOP, and number of macroblocks;

a time acquisition step in the stream server device of acquiring from at least one of the plurality of stream record/playback devices, distribution request information including a preset distribution time at which the content starts being distributed;

a stream transmitting step in the stream server device of transmitting the stream from which control information has been removed to one or more of the stream record/playback devices before preset distribution time, and transmitting the stream of control information to the one or more stream record/playback devices when the preset distribution time is reached;

a time notifying step in the least one of the plurality of stream record/playback devices of transmitting to the stream server device the distribution request information;

a receiving step in each stream record/playback device of receiving the stream from which control information has been removed and the stream of control information;

a storage step in each stream record/playback device of storing the received stream from which control information has been removed;

a combining step in each stream record/playback device of combining the received stream of control information with the stream stored in the storage step; and a stream playback step in each stream record/playback device of playing a stream that results from the combining in the combining step, the played stream being the same as the stream stored by the stream server device.

24. A stream distribution method of a stream server device in a stream distribution system having the stream server device, which stores a stream that includes a content and control information necessary for image playback of the content, and a plurality of stream record/playback devices that are connected via a network, comprising:

a separating step of separating a stream of control information from the stored stream, wherein the stored stream cannot be played without the stream of control information, the stream of control information including information regarding frame height, time period differential from prior VOP, and number of macroblocks;

a time acquisition step of acquiring form the cache server device, distribution request information including a preset distribution time at which the content starts being distributed; and a stream transmitting step of transmitting the stream from which control information has been removed to one or more of the stream record/playback devices before the start time, and transmitting the stream of control information to the one or more stream record/playback devices when the preset distribution time is reached.

25. A stream record/playback method of a stream record/playback device in a stream distribution system having a stream server device that stores a stream which includes a content and control information necessary for image playback of the content, and a plurality of the stream record/playback devices, which are connected via a network, comprising:
- a time notifying step of transmitting to the stream server device a distribution request information including a preset distribution time at which the content starts being distributed;
- a receiving step of receiving a stream from which control information has been removed and a stream of control information, wherein the stream cannot be played without the stream of control information, the stream of control information including information regarding frame height, time period differential from prior VOP, and number of macroblocks;
- a storage step of storing the received stream from which control information has been removed;
- a combining step of combining the received stream of control information with the stream stored in the storage step; and
- a stream playback step of playing a stream that results from the combining in the combining step, the played stream being the same as the stream stored by the stream server device.

26. A stream distribution system comprising a stream server device that stores a stream which includes a content and control information necessary for image playback of the content, a plurality of terminal devices that playback a received stream, and a cache server device that mediates between the stream server device and the terminal devices via a network, the stream server device including:
- a separating unit separating a stream of control information from the stored stream, wherein the stored stream cannot be played without the stream of control information, the stream of control information including information regarding frame height, time period differential from prior VOP, and number of macroblocks;
- a time acquisition unit acquiring, from the cache server device, distribution request information including a preset distribution time at which the content starts being distributed; and
- a stream record/transmit unit recording the stream from which control information has been removed onto a portable recording medium in advance, and to transmit the stream of control information to the cache server device when the preset distribution time is reached, and
the cache server device including:
- a time notifying unit transmitting the distribution request information to the stream server device;
- a receiving unit receiving the stream of control information;
- an acquiring unit operable to acquire the stream, recorded onto the recording medium, from which control information has been removed;
- a combining unit combining the received stream of control information with the acquired stream; and
- a stream transmitting unit transmitting a stream that results from the combining by the combining unit to one or more of the terminal devices, the transmitted stream being the same as the stream stored by the stream server device.

27. A stream server device in a stream distribution system having the stream server device, which stores a stream that includes a content and control information necessary for image playback of the content, a plurality of terminal devices that playback a received stream, and a cache server device that mediates between the stream server device and the terminal devices via a network, comprising:
- a separating unit separating a stream of control information from the stored stream; wherein the stored stream cannot be played back without the stream of control information, the stream of control information including information regarding frame height, time period differential from prior VOP, and number of macroblocks;
- a time acquisition unit acquiring, from the cache server device, distribution request information including a preset distribution time at which the content starts being distributed; and
- a stream record/transmit unit recording the stream from which control information has been removed onto a portable recording medium in advance, and to transmit the stream of control information to the cache server device when the preset distribution time is reached.

28. A cache server device in a stream distribution system having a stream server device that stores a stream which includes a content and control information necessary for image playback of the content, a plurality of terminal devices that playback a received stream, and the cache server device, which mediates between the stream server device and the terminal devices via a network, comprising:
- a time notifying unit transmitting distribution request information including a preset distribution time at which the content starts being distribute;
- a receiving unit receiving a stream of control information;
- an acquiring unit acquiring a stream, recorded onto a recording medium, from which control information has been removed, wherein the stream cannot be played back without the control information, the control information including information regarding frame height, time period differential form prior VOP, and number of macroblocks;
- a combining unit combining the received stream of control information with the acquired stream; and
- a stream transmitting unit transmitting a stream that results from the combining by the combining unit to one or more of the terminal devices, the transmitted stream being the same as the stream stored by the stream server device.

29. A stream distribution system comprising a stream server device that stores a stream which includes a content and control information necessary for image playback of the content, and a plurality of stream record/playback devices, the stream server device including:
- a separating unit separating a stream of control information from the stored stream, wherein the stored stream cannot be played back without the stream of control information, the stream of control information including information regarding frame height, time period differential from prior VOP, and number of macroblocks;
- a time acquisition unit acquiring, from at least one of the plurality of stream record/playback devices, distribution request information including a preset distribution time at which the content starts being distributed; and
- a stream record/transmit recording the stream from which control information has been removed onto a portable recording medium in advance, and to transmit the stream of control information to one or more of the stream record/playback devices via a network when the start time is reached, and
the stream record/playback devices each including:
- a time notifying unit transmitting the distribution request information to the stream server device;
- a receiving unit receiving the stream of control information via the network;

an acquiring unit acquiring the stream, recorded onto the recording medium, from which control information has been removed;

a combining unit combining the received stream of control information with the acquired stream; and a stream playback unit playing back a stream that results from the combining by the combining unit, the played stream being the same as the stream stored by the stream server device.

30. A stream server device in a stream distribution system having the stream server device, which stores a stream that includes a content and control information necessary for image playback of the content, and a plurality of stream record/playback devices, comprising:

a separating unit separating a stream of control information from the stored stream, wherein the stored stream cannot be played back without the stream of control information, the stream of control information including information regarding frame height, time period differential from prior VOP, and number of macroblocks;

a time acquisition unit acquiring, from at least one of the plurality of stream record/playback devices, distribution request information including a preset distribution time at which the content starts being distributed; and a stream record/transmit unit recording the stream from which control information has been removed onto a portable recording medium in advance, and to transmit the stream of control information to one or more of the stream record/playback devices via a network when the preset distribution time is reached.

31. A stream record/playback device in a stream distribution system having a stream server device that stores a stream which includes a content and control information necessary for image playback of the content, and a plurality of the stream record/playback devices, comprising:

a receiving unit receiving a stream of control information via the network the stream of control information including information regarding frame height, time period differential from prior VOP, and number of macroblocks;

an acquiring unit acquiring a stream, recorded onto a recording medium, from which control information has been removed, wherein the stream cannot be played back without the control information;

a combining unit combining the received stream of control information with the acquired stream; and a stream playback unit playing back a stream that results from the combining by the combining unit, the played stream being the same as the stream stored by the stream server device.

32. A stream distribution system comprising a stream server device that stores a stream which includes a content and control information necessary for image playback of the content, a plurality of terminal devices that playback a received stream, and a cache server device that mediates between the stream server device and the terminal devices via a network, the stream server device including:

a separating unit separating a stream of control information from the stored stream, wherein the stored stream cannot be played back without the stream of control information, the stream of control information including information regarding frame height, time period differential from prior VOP, and number of macroblocks; and a stream recording unit recording the stream from which control information has been removed onto a portable first recording medium, and to record the stream of control information onto a portable second recording medium, and the cache server device including:

an acquiring unit acquiring the stream, recorded onto the first recording medium, from which control information has been removed, and the stream of control information recorded onto the second recording medium, a combining unit combining the stream of control information acquired from the second recording medium with the stream acquired from the first recording medium; and a stream transmitting unit transmitting a stream that results from the combining by the combining unit to one or more of the terminal devices, the transmitted stream being the same as the stream stored by the stream server device.

33. A stream server device in a stream distribution system having the stream server device, which stores a stream that includes a content and control information necessary for image playback of the content, a plurality of terminal devices that playback a received stream, and a cache server device that mediates between the stream server device and the terminal devices via a network, comprising:

a separating unit separating a stream of control information from the stored stream, wherein the stored stream cannot be played back without the stream of control information, the stream of control information including information regarding frame height, time period differential from prior VOP, and number of macroblocks; and a stream recording unit recording the stream from which control information has been removed onto a portable first recording medium, and to record the stream of control information onto a portable second recording medium.

34. A cache server device in a stream distribution system having a stream server device that stores a stream which includes a content and control information necessary for image playback of the content, a plurality of terminal devices that playback a received stream, and the cache server device, which mediates between the stream server device and the terminal devices via a network, comprising:

an acquiring unit acquiring a stream, recorded onto a portable first recording medium, from which control information has been removed, and a stream of control information recorded onto a portable second recording medium, wherein the stream cannot be played back without the control information, the control information including information regarding frame height, time period differential from prior VOP, and number of macroblocks;

a combining unit combining the stream of control information acquired from the second recording medium with the stream acquired from the first recording medium; and a stream transmitting unit transmitting a stream that results from the combining by the combining unit to one or more of the terminal devices, the transmitted stream being the same as the stream stored by the stream server device.

35. A stream distribution system comprising a stream server device that stores a stream which includes a content and control information necessary for image playback of the content, and a plurality of stream record/playback devices, the stream server device including:

a separating unit separating a stream of control information from the stored stream, wherein the stored stream cannot be played back without the stream of control information, the stream of control information including information regarding frame height, time period differential from prior VOP, and number of macroblocks; and a stream recording unit operable to record the stream from which control information has been removed onto a portable first recording medium, and to record the stream of control information onto a portable second recording medium, and the stream record/playback devices each including:

an acquiring unit acquiring the stream, recorded onto the first recording medium, from which control information has been removed, and the stream of control information recorded onto the second recording medium;

a combining unit combining the stream of control information acquired from the second recording medium with the stream acquired from the first recording medium; and a stream playback unit operable to playback a stream that results from the combining by the combining unit, the played stream being the same as the stream stored by the stream server device.

36. A stream server device in a stream distribution system having the stream server device, which stores a stream that includes a content and control information necessary for image playback of the content, and a plurality of stream record/playback devices, comprising:

a separating unit separating a stream of control information from the stored stream, wherein the stored stream cannot be played back without the stream of control information, the stream of control information including information regarding frame height, time period differential from prior VOP, and number of macroblocks; and a stream recording unit recording the stream from which control information has been removed onto a portable first recording medium, and to record the stream of control information onto a portable second recording medium.

37. A stream record/playback device in a stream distribution system having a stream server device that stores a stream which includes a content and control information necessary for image playback of the content, and a plurality of the stream record/playback devices, comprising:

an acquiring unit acquiring a stream, recorded onto a portable first recording medium, from which control information has been removed, and a stream of control information recorded onto a portable second recording information medium, wherein the stream cannot be played back without the control information, the control information including information regarding frame height, time period differential from prior VOP, and number of macroblocks;

a combining unit combining the stream of control information acquired from the second recording medium with the stream acquired from the first recording medium; and a stream playback unit operable to playback a stream that results from the combining by the combining unit, the played stream being the same as the stream stored by the stream server device.

38. The stream distribution system of claim 1, wherein the Stream server device and the cache server device are at two physically different locations across a network wherein security of the control information can be maintained at the stream server device.

39. The stream distribution system of claim 1, wherein the control information is inaccessible by the cache server device before the start time.

40. The stream distribution system of claim 6, wherein the dummy data contains null information.

* * * * *

UNITED STATES PATENT AND TRADEMARK OFFICE
CERTIFICATE OF CORRECTION

PATENT NO. : 7,548,984 B2
APPLICATION NO. : 10/444403
DATED : June 16, 2009
INVENTOR(S) : Kurauchi It is certified that error appears in the above-identified patent and that said Letters Patent is hereby corrected as shown below:

In the Claims:
Claim 1, Column 22, line 36, "unit acquiring, the cache" should read --unit acquiring, from the cache--;
Claim 3, Column 23, line 9, "device" should read --devices--;
Claim 3, Column 23, line 9, "regarding from height" should read --regarding frame height--;
Claim 3, Column 23, line 20, --server-- should be inserted before "device";
Claim 5, Column 23, line 33, "distributed" should read --distribution--;
Claim 6, Column 23, line 40, "to insert" should read --inserts--;
Claim 12, Column 24, line 25, "control including" should read --control information including--;
Claim 12, Column 24, line 26, "different" should read --differential--;
Claim 16, Column 25, line 25, "form" should read --from--;
Claim 16, Column 25, line 32, "present" should read --preset--;
Claim 18, Column 26, lines 2-5, should read
"the control information is header information,
the stream server device has a header information elimination table that includes, for each content, a header information elimination level, and";
Claim 21, Column 27, line 23, a --,-- should be inserted between "information" and "including";
Claim 23, Column 28, line 24, "in the least" should read "in the at least";
Claim 24, Column 28, line 54, "form" should be "from";
Claim 27, Column 30, line 2, the ";" should be a ",";
Claim 28, Column 30, line 25, "distribute" should be --distributed--;
Claim 28, Column 30, line 32, "form" should be --from--;
Claim 29, Column 30, line 56, after "transmit" --unit-- should be inserted;
Claim 35, Column 33, line 20, "operable to playback" should be --playing back--;

UNITED STATES PATENT AND TRADEMARK OFFICE
CERTIFICATE OF CORRECTION

PATENT NO. : 7,548,984 B2
APPLICATION NO. : 10/444403
DATED : June 16, 2009
INVENTOR(S) : Kurauchi It is certified that error appears in the above-identified patent and that said Letters Patent is hereby corrected as shown below:

Claim 37, Column 24, line 22, "operable to playback" should be --playing back--.

Signed and Sealed this

Tenth Day of November, 2009

David J. Kappos
*Director of the United States Patent and Trademark Office*